(12) United States Patent
Friend et al.

(10) Patent No.: US 6,497,368 B1
(45) Date of Patent: Dec. 24, 2002

(54) PORTABLE DATA COLLECTION

(75) Inventors: Steven D. Friend, Felton; Kurt Kordes, Pleasanton; Dennis Silva, San Jose, all of CA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/233,398

(22) Filed: Jan. 19, 1999

Related U.S. Application Data

(60) Provisional application No. 60/072,199, filed on Jan. 22, 1998.

(51) Int. Cl.$^7$ ................................................. G06K 7/10
(52) U.S. Cl. ....................... 235/472.01; 235/462.13; 235/462.45; 235/449
(58) Field of Search ..................... 235/472.01, 449, 235/462.13, 462.45

(56) References Cited

U.S. PATENT DOCUMENTS

| | | | | |
|---|---|---|---|---|
| 4,701,003 A | | 10/1987 | Gruet ........................... 439/680 |
| 4,773,032 A | | 9/1988 | Uehara et al. ......... 364/709.04 |
| 4,782,217 A | | 11/1988 | Soza et al. ................... 235/380 |
| 4,850,009 A | | 7/1989 | Zook et al. .................... 379/96 |
| 5,031,098 A | * | 7/1991 | Miller et al. ................. 364/405 |
| 5,052,943 A | | 10/1991 | Davis ........................... 439/357 |
| 5,195,183 A | | 3/1993 | Miller et al. ................. 395/275 |
| 5,216,233 A | | 6/1993 | Main et al. ................... 235/472 |
| 5,218,187 A | | 6/1993 | Koenck et al. .............. 235/375 |
| 5,221,838 A | * | 6/1993 | Gutman et al. .............. 235/379 |
| 5,294,782 A | | 3/1994 | Kumar .......................... 235/462 |
| 5,305,181 A | | 4/1994 | Schultz ........................ 361/680 |
| 5,317,691 A | | 5/1994 | Traeger ........................ 395/200 |
| 5,347,115 A | | 9/1994 | Sherman et al. ............. 235/472 |
| 5,349,497 A | | 9/1994 | Hanson et al. ............... 361/683 |
| 5,371,858 A | | 12/1994 | Miller et al. ................. 395/275 |
| 5,406,063 A | | 4/1995 | Jelen ............................ 235/472 |
| 5,410,141 A | | 4/1995 | Koenck et al. .............. 235/472 |
| 5,479,530 A | | 12/1995 | Nair et al. .................... 382/119 |
| 5,484,991 A | | 1/1996 | Sherman et al. ............. 235/472 |
| 5,517,434 A | | 5/1996 | Hanson et al. ........... 364/708.1 |
| 5,521,369 A | * | 5/1996 | Kumar ......................... 235/472 |
| 5,521,370 A | | 5/1996 | Hanson ........................ 235/472 |
| 5,587,577 A | | 12/1996 | Schultz ........................ 235/472 |
| 5,672,860 A | * | 9/1997 | Miller et al. ................. 235/472 |
| 5,679,943 A | | 10/1997 | Schultz et al. ............... 235/472 |
| 6,052,279 A | * | 4/2000 | Friend et al. ................ 361/686 |
| 6,189,788 B1 | * | 2/2001 | Sherman et al. ............. 235/383 |

* cited by examiner

*Primary Examiner*—Karl D. Frech
(74) *Attorney, Agent, or Firm*—Suiter & Associates, PC

(57) ABSTRACT

A portable data collection system employing a portable data terminal having increased functionality is disclosed. The portable data terminal includes an integral magnetic stripe reader for reading information magnetically encoded on a magnetic stripe card, such as a credit card or the like. An interchangeable feature pod may be attachable to the data terminal and may include a selected data collection or communication device such as, for example, a data communication port, optical indicia reader or laser scanner to facilitate data entry and communication. The interchangeable feature pod may include a compact, ergonomically efficient actuator for activating the selected data collection or communication device. Interconnection of the portable data terminal to interchangeable feature apparatus such as an electrical power supply, peripheral devices, or data communication apparatus may be accomplished via separate line connection, a port replication apparatus or a vehicle docking apparatus.

44 Claims, 20 Drawing Sheets

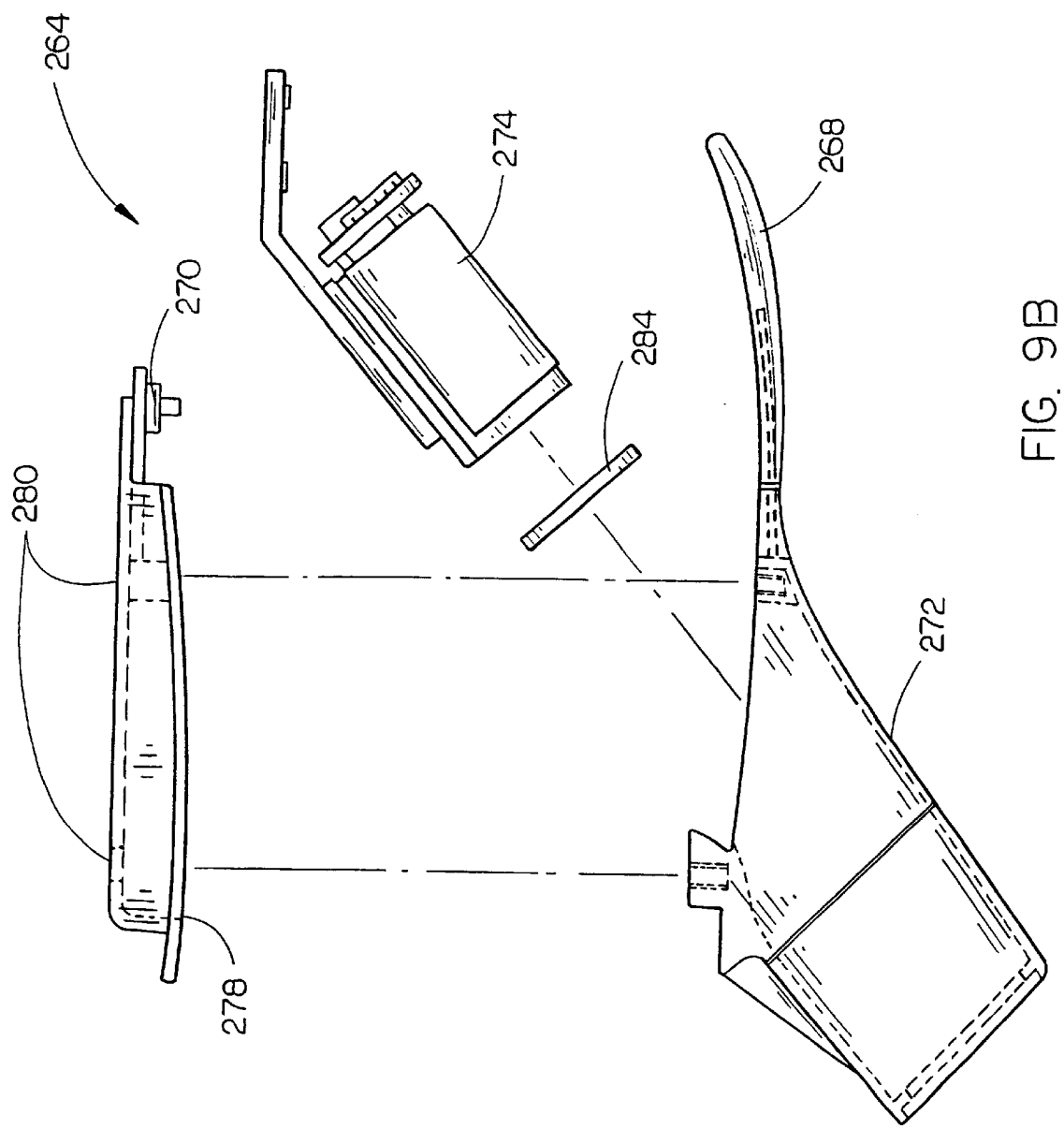

PORTABLE DATA COLLECTION

CROSS-REFERENCE TO RELATED APPLICATIONS

The present application claims the benefit under 35 U.S.C. § 119 of U.S. Provisional Application No. 60/072,199, filed on Jan. 22, 1998. Said U.S. Provisional Application No. 60/072,199 is herein incorporated by reference in its entirety.

INCORPORATION BY REFERENCE

The following related commonly owned United States Patents are incorporated herein by reference in their entirety:

| Inventor(s) | Ser. No. | Filing Date | U.S. Pat. No. | Issue Date |
| --- | --- | --- | --- | --- |
| Silva et al. | 08/848,511 | Apr. 28, 1997 | 5,805,416 | Sep. 8, 1998 |
| Silva et al. | 08/499,593 | Jul. 7, 1995 | 5,680,334 | Oct. 21, 1997 |
| Beard | 08/328,250 | Oct. 24, 1994 | 5,631,539 | May 20, 1997 |
| Beard | 08/486,812 | Jun. 7, 1995 | 5,627,412 | May 6, 1997 |
| Koenck et al. | 08/192,525 | Feb. 4, 1994 | 5,418,684 | May 23, 1995 |
| Koenck et al. | 08/777,393 | Jan. 7, 1992 | 5,410,141 | Apr. 25, 1995 |
| Hanson et al. | 08/956,730 | Oct. 5, 1992 | 5,349,497 | Sep. 20, 1994 |
| Koenck et al. | 08/071,555 | Jun. 4, 1993 | 5,331,136 | Jul. 19, 1994 |
| Koenck et al. | 08/987,574 | Dec. 8, 1992 | 5,313,053 | May 17, 1994 |
| Koenck et al. | 08/660,615 | Feb. 25, 1991 | 5,218,187 | Jun. 8, 1993 |
| Koenck et al. | 08/633,500 | Dec. 26, 1990 | 5,202,817 | Apr. 13, 1993 |
| Hacker et al. | 08/415,169 | Sep. 29, 1989 | 5,123,064 | Jun. 16, 1992 |

In addition, the following related commonly owned patent applications are incorporated herein by reference in their entirety:

| Docket No. | Inventor(s) | Ser. No. | Filing Date |
| --- | --- | --- | --- |
| 38300R1 | Kunert et al. | 09/065,947 | May 2, 1997 |
| 38251R1 | Kunert et al. | 08/970,678 | Nov. 14, 1997 |
| 38243R1 | Silva et al. | 08/909,603 | Aug. 12, 1997 |
| 38189 | Silva et al. | 08/526,502 | Sep. 11, 1995 |

TECHNICAL FIELD

The present invention relates generally to data collection and processing systems and more particularly to portable data terminals employed as operator manipulated data input and output devices.

BACKGROUND OF THE INVENTION

Portable data terminals are generally known components of state of the art business systems. The data terminals may be taken to merchandise storage facilities for inventory control or customer service transactions, or may be used in any one of various other commercial applications to serve as data input or output devices for central data processing and control systems.

Central data processing and control systems are most useful when business data are always current and readily available. Prompt data entry and retrieval at the working level through various operator controlled portable data terminals is recognized as a basis for optimizing, among various business activities, inventory control and customer service activities, business forecasting and marketing operations, to name just a few. Portable data terminals are also commonly used by sales persons, distributors, delivery persons, auditors, and the like, where it is advantageous to employ a portable data terminal in a route or otherwise mobile setting. Such applications include sales, distribution, control and inventory of products delivered, and delivery or tracking of products, packages, etc. Portable data terminals have proven useful in increasing the efficiency of such applications by automating the entry and electronic storage of order, sales, delivery, receipt, pricing, inventory control, and other information.

Portable data terminals typically include apparatus to facilitate efficient input and manipulation of data by a user. For example, a portable data terminal may include such apparatus as keypads, touch screens, laser scanners, optical indicia readers, and the like. Preferably, such apparatus allow the data terminal to read and manipulate data recorded in a variety of mediums and in many different formats.

Prior art portable data terminals typically implement trigger switches as a pistol-type switch which is analogous to a handgun in design. Such handgun styled data terminals are usually large, bulky and awkward, the inelegance of which is realized when a pistol styled data terminal is placed upon a flat surface such as a table. Further, as advancement in miniaturization of electronics results in a reduction in the size of portable data terminals, attachment of a pistol grip trigger to the data terminal becomes limited.

Often, portable data terminals are placed in a storage apparatus or docks to recharge their internal batteries and transfer data stored in their memory to a central computer for processing. However, where a data collection terminal must operate for long periods of time, e.g., at remote sites, vehicle mounted docks are needed to recharge the data collection terminal's batteries in the field. The vehicle dock may also provide for data communication during battery recharge. Examples of such data communication include wireless links such as RF, cellular telephone, etc., whereby inventory, sales, or delivery information may be transmitted prior to the end of an operator's shift or completion of a route, communication with a portable printer to provide a hard copy such as an invoice or delivery ticket, communication with a fax and/or modem, etc. A vehicle dock should provide positive retention of the data terminal while the vehicle is in motion. As many operators may not be inclined toward painstaking or precise manipulations, a vehicle docking apparatus should be quickly and simply operated.

For these reasons, it would be advantageous to provide an improved portable data collection system having increased functionality and employing a portable data terminal having an integral magnetic stripe reader for reading information magnetically encoded on a magnetic stripe card, such as a credit card or the like. It is further desirable to provide the portable data terminal of such a system with an interchangeable feature pod, wherein the interchangeable feature pod may include a selected data collection or communication device such as, for example, a data communication port, optical indicia reader, laser scanner, or the like to facilitate data entry and communication. Such an interchangeable feature pod should provide a compact, ergonomically efficient actuation means for activating the selected data collection or communication device.

It would also be advantageous to provide a portable data collection system including a port replication apparatus allowing a portable data terminal to be interconnected with multiple peripheral devices via a single interconnection operation. Similarly, it would be desirable to provide a portable data collection system which includes a docking apparatus for docking a portable data collection terminal in a vehicle or the like, wherein the docking apparatus facilitates ease of insertion and removal of the data terminal by a user and provides secure retention of the portable data terminal therein and reliable interconnections between the data terminal and an electrical power source, peripheral devices or data communication apparatus.

SUMMARY OF THE INVENTION

The present invention expands the utility of portable data collection systems. The invention recognizes a need for greater versatility in portable data terminals, thereby improving their overall usefulness. Accordingly, the present invention is directed to a novel portable data collection system employing a portable data collection terminal having increased functionality. The portable data terminal includes an integral magnetic stripe reader for reading information magnetically encoded on a magnetic stripe card, such as a credit card or the like. The housing of the portable data terminal may include an aperture for attachment of an interchangeable feature pod. This interchangeable feature pod may include a selected data collection or communication device such as, for example, a data communication port, optical indicia reader or laser scanner to facilitate data entry and communication. The interchangeable feature pod may include a compact, ergonomically efficient actuation means for activating the selected data collection or communication device.

Interconnection of the data terminal to interchangeable feature apparatus such as an electrical power supply, peripheral devices, or data communication apparatus may be accomplished via separate line connection, a port replicator or a vehicle docking apparatus. The port replicator allows the data terminal to be interconnected with multiple peripheral devices via a single interconnection operation. The vehicle docking apparatus allows for docking of the portable data collection terminal in a vehicle or the like, wherein the docking apparatus facilitates ease of insertion and removal of the data terminal by a user and provides secure retention of the portable data terminal therein and reliable interconnections between the data terminal and an electrical power source, peripheral devices or data communication apparatus.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF AN EXEMPLARY EMBODIMENT

Figure 1:
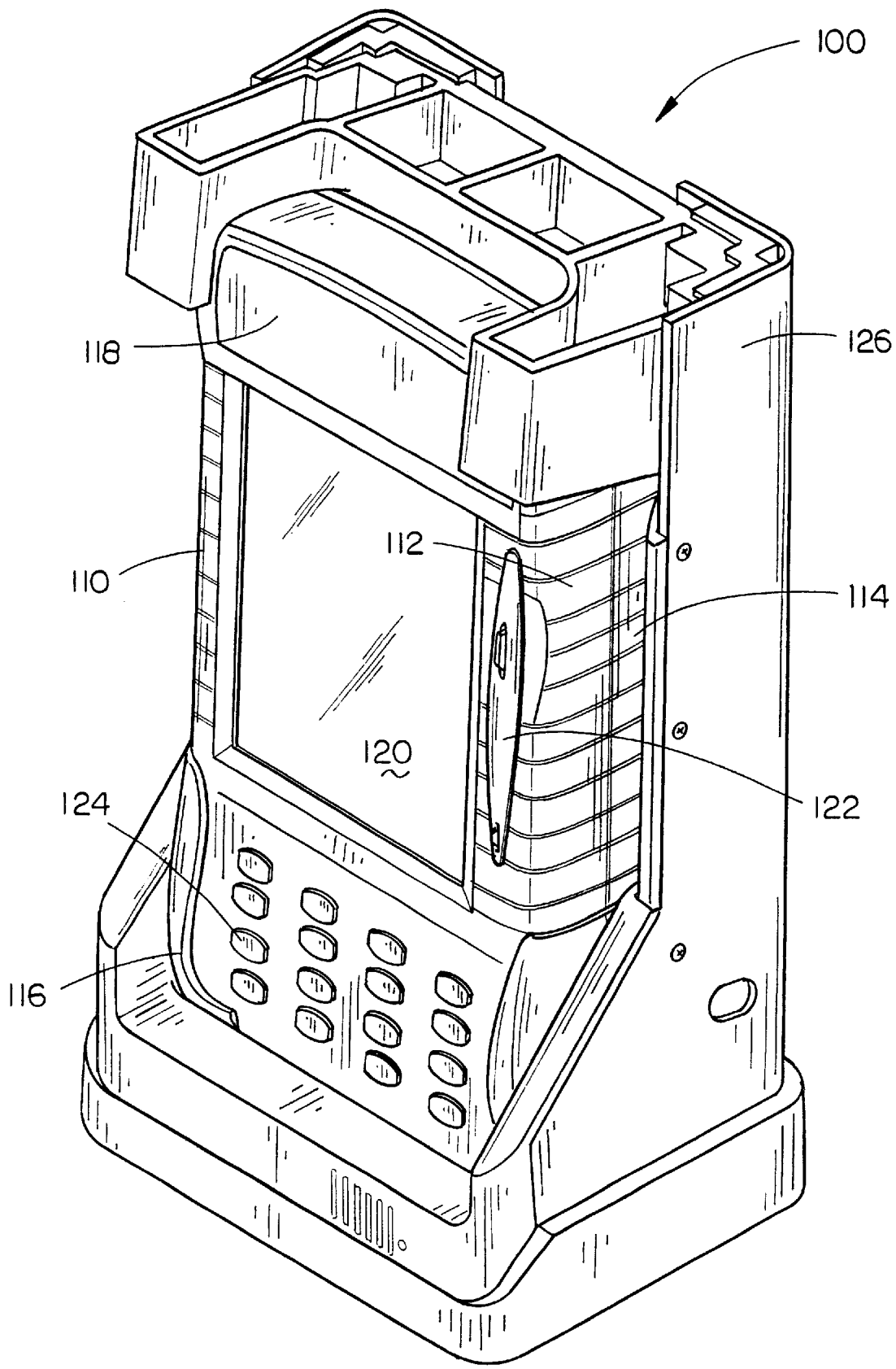
FIG. 1 is an isometric view of a portable data collection system according to an exemplary embodiment of the present invention including a portable data terminal and vehicle docking apparatus for receiving the data terminal.

Reference will now be made in detail to the presently preferred embodiments of the invention, examples of which are illustrated in the accompanying drawings.

Referring generally to FIGS. 1 through 16, the portable data collection system 100 of the present invention employs a portable data collection terminal 110 having increased functionality. In an exemplary embodiment, the portable data terminal 110 includes an integral magnetic stripe reader 230 for reading information magnetically encoded on a magnetic stripe card 234. The housing 112 of the portable data terminal 110 may further include an aperture for attachment of an interchangeable feature pod 264. This interchangeable feature pod 264 may include a selected data collection or communication device such as, for example, a data communication port, optical indicia reader or laser scanner to facilitate data entry and communication. Preferably, the interchangeable feature pod 264 includes a compact, ergonomically efficient actuation means for activating the selected data collection or communication device.

Interconnection of the data terminal 110 to external devices (e.g., an electrical power supply, peripheral devices, data communication apparatus, etc.) may be accomplished via separate line connection, a port replicator 310 or a vehicle docking apparatus 126. The port replicator 310 allows the portable data terminal 110 to be interconnected with multiple peripheral devices via a single interconnection operation. The vehicle docking apparatus 126 allows for docking of the portable data collection terminal 110 in a vehicle, facilitates ease of insertion and removal of the data terminal 110 by a user, and provides secure retention of the portable data terminal 110 and reliable interconnections between-the data terminal 110 and an electrical power source, peripheral devices or data communication apparatus.

Referring now to FIG. 1, a portable data collection system 100 in accordance with an exemplary embodiment of the present invention is shown. The portable data collection system 100 includes a portable data terminal generally designated herein by the numeral 110. The portable data terminal 110 is comprised of a portable, hand-held unit capable of operating from a self-contained power source. The portable data terminal 110 may operate in what is referred to as batch mode in which data are collected and stored within the data terminal 110 to be transferred to an alternate data processing unit or host data terminal (not shown) in a comprehensive batch type data transfer operation. Alternatively, the portable data terminal 110 may communicate with a host computer or data terminal in an interactive or on-line mode via a data communications link such as a radio frequency (RF) transceiver assembly, a cable-type assembly or an infrared data link.

The data terminal 110, as described herein in a preferred exemplary embodiment, has a generally elongate, rectangular shape comprised of an upper housing shell 112 and a lower housing shell 114. The upper and lower housing shells 112 & 114 are preferably made of a molded high-impact strength plastic material. Such materials provide resistance and durability so that the data terminal 110 may survive multiple drops to a hard surface (e.g., concrete) from hand-held levels, driving rain and moisture, and extreme operating temperatures. In this manner, the portable data terminal 110 may be operable in a wide range of environments. For example, the portable data terminal 110, in the exemplary embodiment described herein, may be operable in environments having a temperature range of about −20 C. to about 50 C. and storable in environments having as temperature range of about −30 C. to about 70 C. The portable data terminal may also withstand humidity ranging from about 5% to about 95% atmospheric humidity and resist rains of up to about 6 inches ( 1524 mm) rain per hour and winds of up to about 40 miles ( 64 km) per hour.

Figure 2:
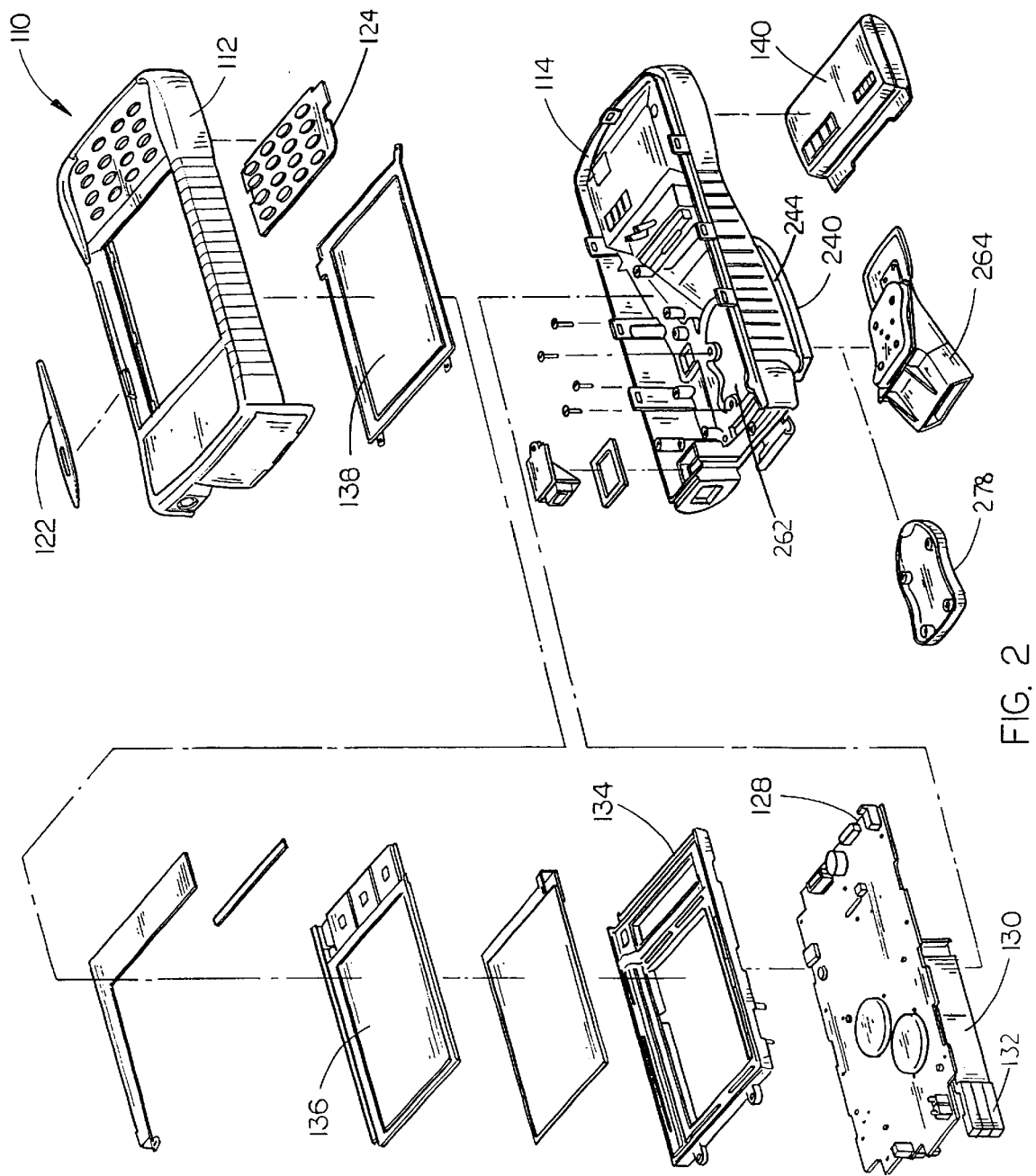
FIG. 2 is an exploded isometric view of the portable data terminal shown in FIG. 1.

The portable data terminal 110, when viewed from above as held by the user, has a lower end portion 116 and a top end portion 118. A display 120 is disposed on the upper housing shell 112 near the top end portion 118 for displaying data and information to the user. The display 120 preferably comprises a liquid crystal display (LCD) screen 136 (FIG. 2). Such display screens provide satisfactory viewing contrast under most direct lighting conditions. Backlighting of the display 120 may further be utilized to provide supplemental illumination of the display screen 136 (FIG. 2). Power management considerations may entertain selective illumination in accordance with varying ambient light levels. The contrast control of the display 120 preferably includes automatic temperature compensated contrast control.

In accordance with the preferred exemplary embodiment shown, the display 120 preferably provides a rectangular display area comprising a 240 (width)×320 (length) pixel array being a standard color/graphics adapter (CGA) format controlled display having a video graphics adapter (VGA) driver interface and four gray scales. In a further exemplary embodiment, the display 120 may provide improved display capabilities such as a greater number of gray scales, color, or a super video graphics adapter (SVGA) driver interface, for example. The display 120 further provides touch screen actuated data input and user interface control. The display 120 preferably responds to tactile stimuli such as the finger of the operator or an input stylus 122. Signature capturing capabilities may be provided by utilization of the input stylus 122. Touch screen interface functions are provided by utilization of various software environments. Such software environments include, but are not limited to operating systems and user interfaces such as MS-DOS or Microsoft® Windows® with Pen Extensions available from Microsoft Corporation, Power PenPal available from PenPal™ Associates, or Pen Right!Pro available from PenRight Corporation, for example.

The portable data terminal 110 is controlled by a central processing system. The central processing system includes a central processing unit such as a microprocessor or microcontroller for executing programs, performing data manipulations and controlling the tasks of the data terminal 110. Communication with the central processing system may be implemented through a system bus for transferring information among the components of the data terminal 110. The bus may include a data channel for facilitating information transfer between storage and other components of the data terminal 110. The bus may further provide the set of signals required for communication with the central processing system including a data bus, address bus, and control bus. The bus may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S- 100, and so on. The portable data terminal 110, in accordance with a preferred embodiment of the invention, utilizes a 386SL 33 MHz (megahertz) microprocessor and operates in 386 enhanced mode. However, with the rapid advancement of microprocessor technologies, utilization of state-of-the-art microprocessors having clock speeds significantly faster than 33 MHz is anticipated. For example, the data terminal 110 could be equipped with a P5 300 MHz or greater processor thereby providing significantly faster data processing speeds. The portable data terminal 110 further employs power management technologies in order to prolong battery life.

The portable data terminal 110 preferably includes a keypad 124 disposed on the upper housing shell 112 near the bottom end 116. The keypad 124 is preferably a numeric 16-key providing tactile keying response for feedback of successful key entry. The keys of the keypad 124 may be ergonomically shaped to the human fingertip and may be arranged and color coded according to function to enhance key recognition and speed of key entry. Interchangeable keypad overlays may be provided to accommodate multiple keypad function arrangements. Preferably, the keypad 124 includes multi-directional control keys providing navigation control functions for the display 120 such as scrolling, for example.

As shown in FIG. 1, the portable data collection system 100 of the present invention may further comprise a docking station 126 for receiving the portable data terminal 110 when removably inserted therein. The docking station 126 may include communication and charging apparatus for charging the data terminal's internal power supply (e.g., battery), coupling the data terminal 110 to an external electrical power source, and/or providing data communication between the data terminal 110 and a central computer, central data terminal, various peripheral devices, or the like. Examples of such data communication include communication via wireless links such as radio frequency (RF), cellular telephone, etc., whereby inventory, sales, or delivery information may be transmitted prior to the end of an operator's shift or completion of a route, communication with a portable printer to provide a hard copy such as an invoice or delivery ticket, communication with a fax and/or modem, etc. Preferably, the docking station 126 provides positive retention of the data terminal 110 once it is inserted therein by a user.

FIG. 2 illustrates a preferred assembly of selected components of the portable data collection terminal 110 of the portable data collection system 100 (FIG. 1) of the present invention. A main logic printed circuit board 128 preferably comprises the microprocessor, system bus, and associated memory devices.

Preferably, the portable data collection terminal 110 utilizes a 386SL 33 MHz or greater microprocessor and PC (personal computer) architecture in order to operate in 386 enhanced mode. However, with the rapid advancement of microprocessor technologies, utilization of state-of-the-art (e.g., 486, P5, P6 or greater) microprocessors having clock speeds significantly faster than 33 MHz is anticipated. For example, the data terminal 10 could be equipped with a P5 300 MHz processor thereby providing significantly faster data processing speeds. The data terminal 110 further utilizes power management in order to prolong battery life. The data terminal 110 may utilize a standard operating system such as DOS, Windows®, Windows® 95, Windows NT®, Sun Microsystems Java™ or the like and may include a Plug and Play BIOS allowing the data terminal 110 to be field upgradable by the user. The data terminal 200 may further include software configured to enable utilization of the touch screen such as Pen Extensions 2.0 or the like as well as handwriting recognition software such as CIC Handwriter Recognition System 5.0 or the like.

In a preferred embodiment, the data terminal 110 may include non-volatile memory for storing DOS and BIOS programs. For example, the data terminal 110 may include as standard 1 megabyte of FLASH memory which may be upgradable to 2, 4, 8 or more megabytes of FLASH memory, for example. Additionally, the data terminal 110 may include random access memory (RAM). For example, the data terminal 110 may include as standard 1 megabyte of RAM, preferably DRAM (dynamic random access memory), which may be upgradable, for example, to 2, 4, 8, or more megabytes.

A card receptacle 130 into which a add-in cards conforming to PCMCIA (Personal Computer Memory Card International Association) specifications (i.e., PCMCIA cards or PC cards) are removably inserted may be operably connected to the logic printed circuit board 128 so that it is interconnected with the system bus. As shown, the card receptacle 130 may be housed within upper and lower housing halves 112 & 114 adjacent to the main circuit board 128 to form a card bay which may be accessed by a user to insert a PCMCIA card (PC card). According to an exemplary embodiment, the card receptacle 130 may accept two Type II PCMCIA cards or one Type III PCMCIA card. PCMCIA cards may provide various peripheral and supplemental data terminal functions such as, for example, extended volatile random access memory (RAM), extended nonvolatile semi-permanent memory such as FLASH memory, modem functions, and radio frequency transceivers including RF WAN (wide area network) and RF LAN (local area network) cards. The PCMCIA cards may be removed from the card receptacle 130 by standard PCMCIA card ejector mechanisms actuated by depressing buttons 132.

A mounting bracket 134 may mount the main circuit board 128 and display screen 136 within the data terminal housing. The mounting bracket 134 may be made of a shock absorbing, resilient material. As shown, the mounting bracket 134 may be secured between the main circuit card 128 and the display screen 136 and may comprise mounting features to provide attachment within the data terminal's housing. An electroluminescent backlight panel 137 may provide supplemental illumination of the display screen. A digitizing panel assembly or digitizer comprising a non-glare touch sensitive liquid crystal display overlay or panel 138 may be mounted coincident with the display screen 136. The panel 138 provides touch screen actuated data input and user interface control and preferably responds to tactile stimuli such as the finger of the operator or an input stylus 122. Signature capturing capabilities are further provided by utilization of the input stylus 122.

As discussed in connection with FIG. 1, the numeric 16-key keypad 124 provides additional data entry capability. The keypad 124 may be disposed within the upper housing shell 112 near the bottom end 116. The keypad 124 preferably provides tactile keying response for feedback of successful keyboard entry. The keys of the keypad 124 extend through key apertures in the upper housing shell and are preferably ergonomically shaped to the human fingertip and may be arranged and color coded according to function to enhance key recognition and enhance the speed of key entry. The keypad 124 may further provide multiple interchangeable keypad overlays to accommodate multiple keypad function arrangements. The keypad 124 preferably includes multi-directional control keys providing navigation control functions for the display screen 136 such as scrolling, for example.

An internal power supply 140 may provide electrical power to the data terminal. This internal power supply may comprise a rechargeable battery removably receivable within the data terminal's housing. Preferably, this battery is a Lithium or Lithium Ion type rechargeable battery (a Lithium 7.2 volt 2.8 Ah battery pack with charge level monitor is shown) or the like. Lithium and Lithium Ion type batteries display superior life and charging characteristics. However, Nickel Cadmium (NiCad), Nickel Metal Hydride (NiMH), Lead Acid batteries, or similar batteries may also be utilized. Battery life may be enhanced by utilization of a power management system providing programable doze, sleep, and suspend modes as well as a low battery audible alert when battery charge drops below a predetermined level. A backup battery (not shown) may also be provided. Preferably, this backup battery provides electrical power to maintain the data terminal's memory when the main battery is removed or discharged.

Figure 3:
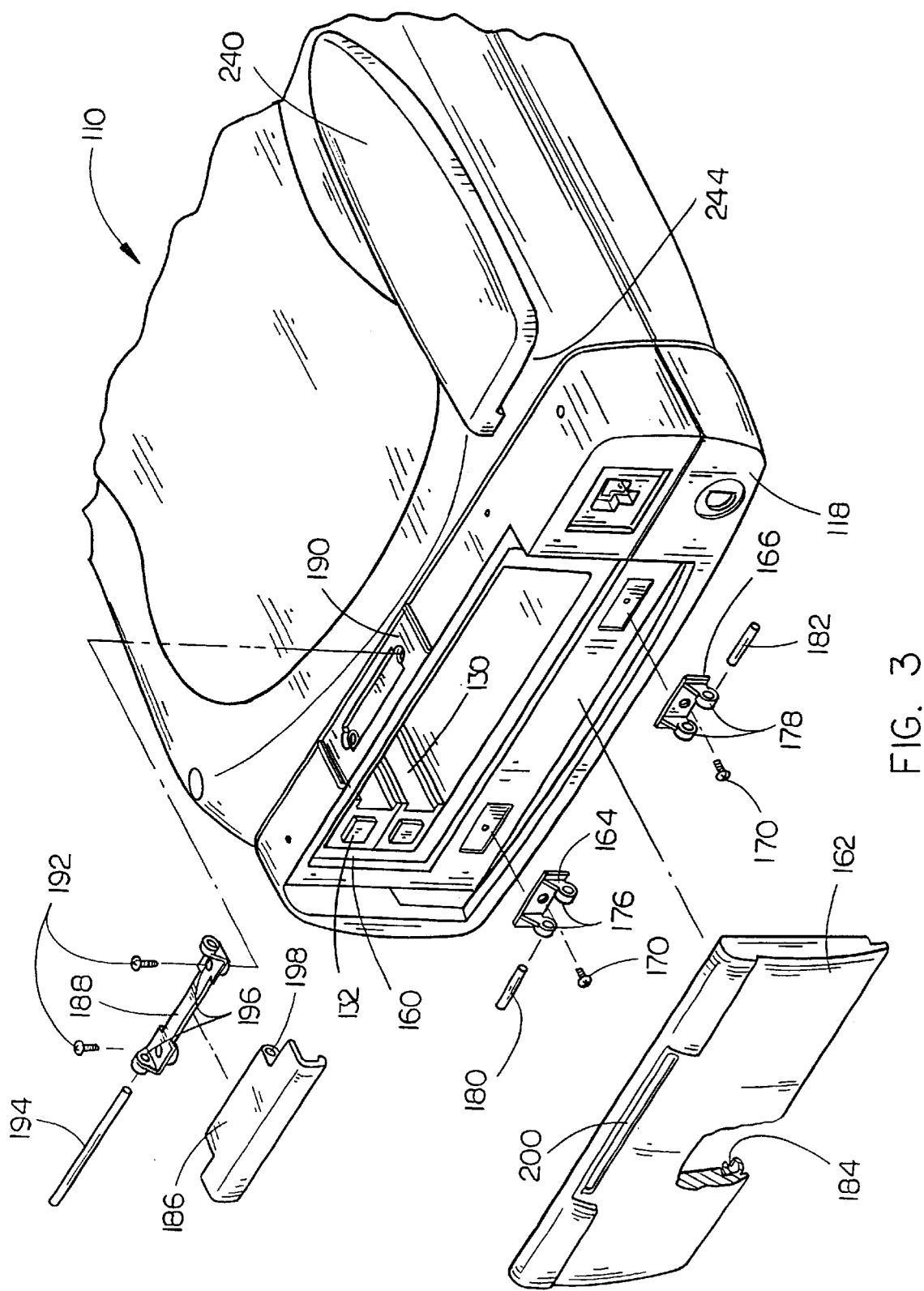
FIG. 3 is an exploded isometric view of the upper end of the data terminal shown in FIGS. 1 and 2, further illustrating a PCMCIA (PC Card) bay door which may be opened by a user to allow insertion and removal of PCMCIA (PC) cards within the portable data terminal.

Turning now to FIG. 3, the upper end of the portable data collection terminal is shown. A card bay 160 is shown at the upper end 118 of the data terminal 110. The card bay 160 houses the card receptacle 130 for receiving and utilizing add-in cards (e.g., PCMCIA cards or PC cards). In the preferred exemplary embodiment shown, the card receptacle 126 is designed to utilize two Type II PCMCIA cards or one Type III PCMCIA card for example. PCMCIA cards may be utilized to provide various peripheral and supplemental data terminal functions such as extended volatile random access memory (RAM), extended nonvolatile semipermanent memory such as FLASH memory, modem functions, and radio frequency transceivers including RF WAN (wide area network) and RF LAN (local area network) cards, for example. The PCMCIA cards may be removed from the card receptacle 130 via standard PCMCIA card ejector mechanisms by depressing card ejector buttons 132.

A generally rectangular card bay door 162 covers the card bay 160 to prevent intrusion of environmental contaminants therein. As shown in FIG. 3, the door 162 may be pivotally attached to the housing via two or more hinges 164 & 166. The door 162 may be pivoted between a closed position wherein environmental contaminants are prevented from entering the card bay 160, and an open position wherein a user may insert and remove add-in cards (PCMCIA cards) within the bay 160. Preferably, each of the hinges 164 & 166 is attached along a perimeter edge of the of the card bay 160 by fasteners 170 (e.g., screws, rivets, bolts, adhesive, etc.). As shown, the hinges 164 & 166 comprise brackets having cylindrical channels 176 & 178 through which a hinge pin 180 & 182 may be inserted. The door 162 may include second channels 184 which engage the hinge pins 180 & 182 allowing the door 162 to be pivoted between the open and closed positions.

A clasp 186 is provided to hold the door 162 in the closed position. The clasp 186 preferably comprises a clasp bracket 188 attached along a perimeter edge of the card bay 160 opposite the hinges 164 & 166 via fasteners 192 (e.g., screws, rivets, bolts, adhesive, etc.). A clasp hinge post 194 extends through holes 196 & 198 in the bracket 188 and the clasp 186 to secure the clasp to the bracket and allow the clasp 186 to pivot thereabout. The clasp 186 may be pivoted to engage a groove 200 in the door 162 when the door is in the closed position thereby holding the door closed. A seal or gasket may be secured to the perimeter of the bay beneath the door 162. As the door 162 is closed and secured by the clasp 186, the gasket is compressed preventing the entrance of environmental contaminants into the bay 160.

Figure 4:
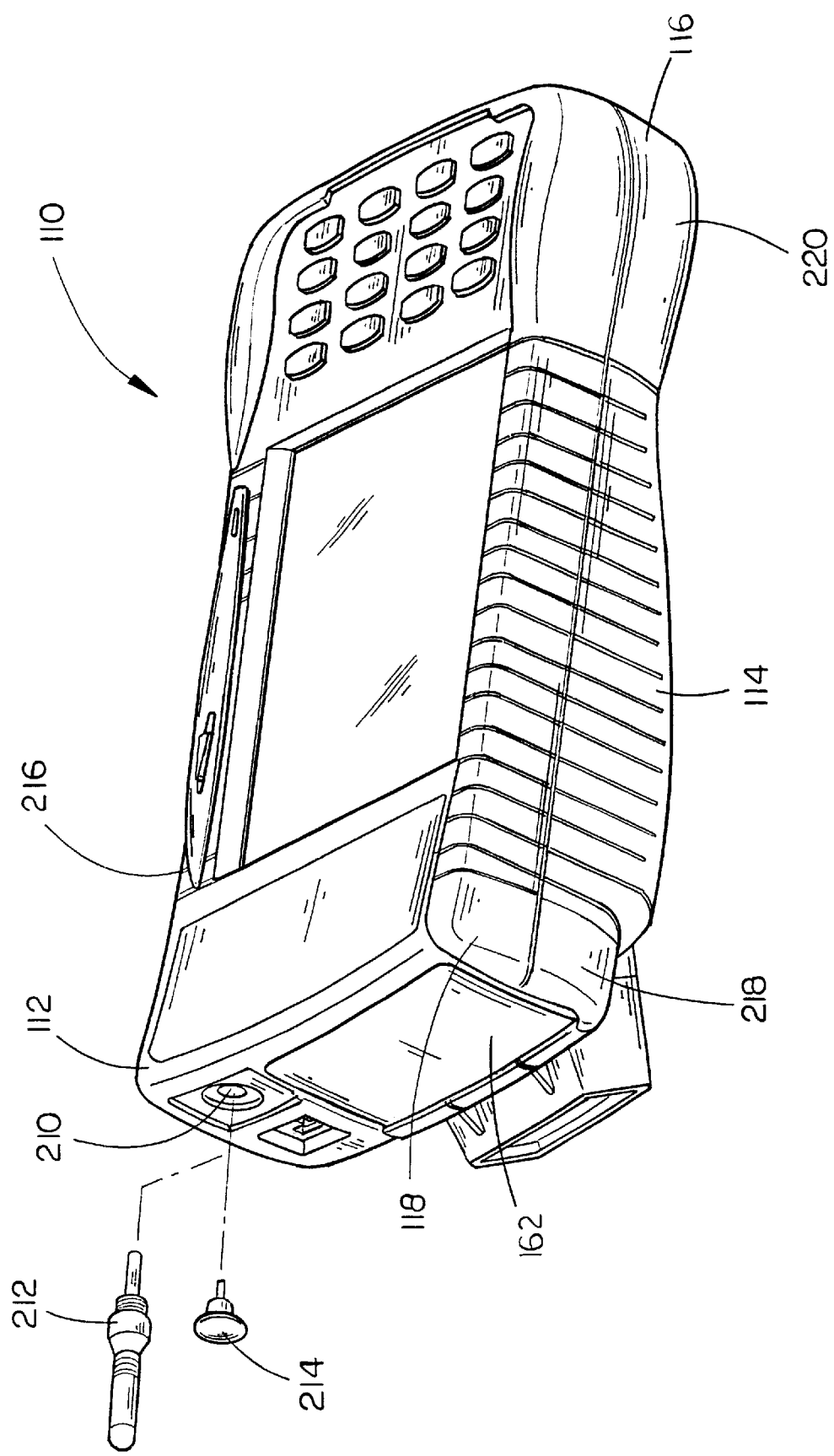
FIG. 4 is an isometric view of a portable data terminal of the data terminal system shown in FIG. 1, illustrating the attachment of an external antenna.

Referring now to FIG. 4, attachment of an external antenna to the portable data terminal is illustrated. The portable data terminal 110 may be in communication with a central computer, host data terminal, or the like in an interactive or on-line mode via a data communications link established by a radio frequency (RF) transceiver assembly or radio. For example, the data terminal 110 may employ such radios as an internal 2.4 Gigahertz (GHz) RF radio (e.g., a Proxim radio) for communication with a 2.4 GHz local area network (LAN) system, an internal cellular digital packet data (CDPD) radio modem for communication with a cellular telephone system, an internal 400 MHz or 900 MHz radio (e.g., RAM radio) for communication with a 400 MHz or 900 MHz Wide Area Network (WAN) data system (e.g., US Mobitex), an internal 800 MHz radio (e.g., Ardis) for communication with a US Motorola Wide Area Network data system, or an internal 900 MHz radio (Motorola) for communication with a 900 MHz private radio network data system, one way paging radio, two way paging radio, GSM (global system for mobile communication) radio, or the like. The portable data terminal 110 may also include internal modems and the like which may be PCMCIA card (PC card) based. For example, the portable data terminal 110 may include an internal data and facsimile (fax) modem, and internal integrated services digital network (ISDN) modem for US ISDN service connections, an internal Ethernet Adapter ( 10 base T) for communication with an Ethernet LAN (Novell, transmission control protocol/Internet protocol (TCP/IP), etc.), or the like.

The portable data terminal 110 may include an antenna port connector 210 for attachment and utilization of an antenna 212. Preferably, the antenna port connector 210 is positioned in the upper end 118 of the data terminal's upper housing half 112 to one side of the card bay door 162. Antennas of varying length or telescopic antennas may be utilized depending upon the desired RF communication operation and characteristics. The external antenna 212 may be attached to the data terminal and coupled to the internal RF transceiver, for example, a PCMCIA card based radio placed in the card bay, via the antenna port 210. Alternatively, the portable data collection terminal 110 may use an internal antenna in lieu of an external antenna 212. Preferably, when an RF transceiver is not utilized with the data terminal 110, such that an antenna is not required, the port 210 may be provided with an antenna port plug 214 for preventing environmental contaminants from entering the port 210.

Figure 5:
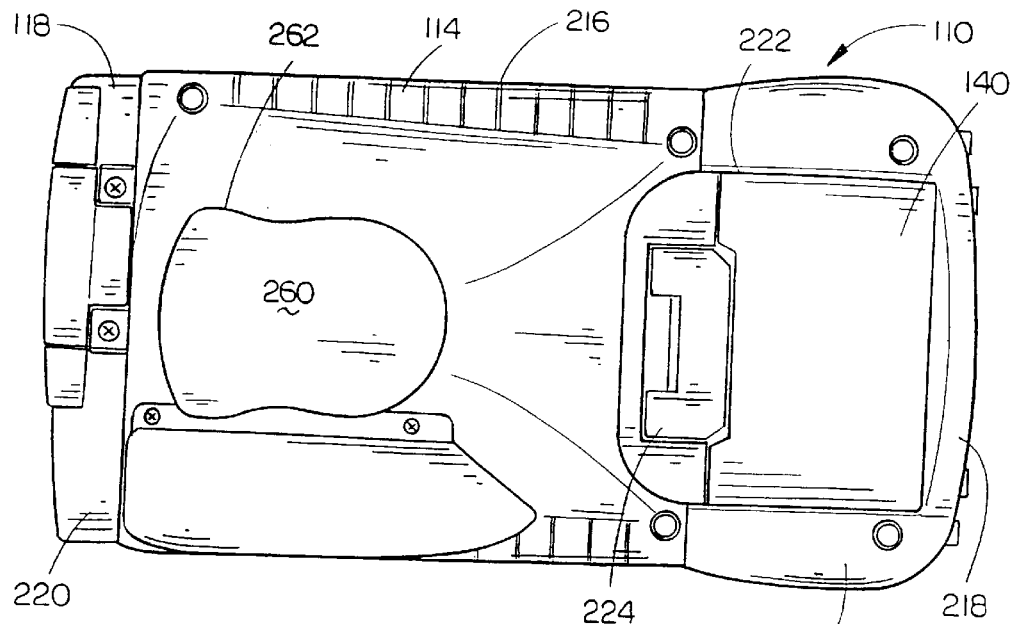
FIG. 5 is a bottom plan view of the portable data terminal shown in FIG. 2, further illustrating the integral magnetic stripe reader.
Figure 6:
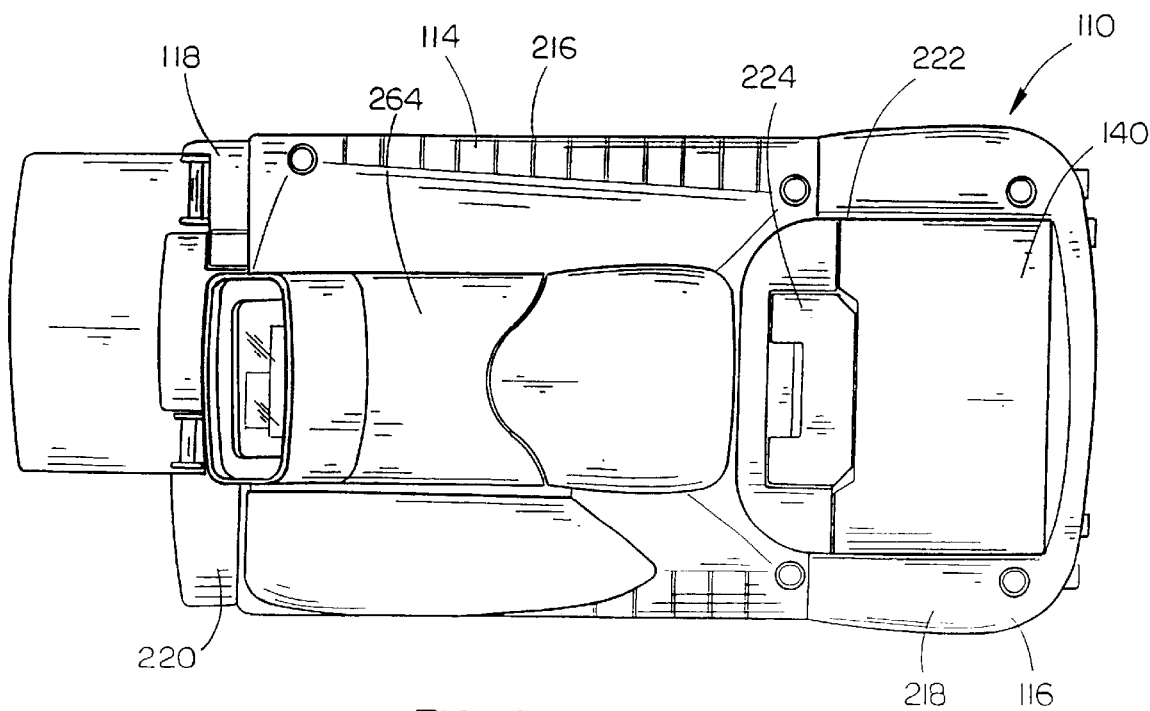
FIG. 6 is a bottom plan view of the data terminal shown in FIG. 2, wherein the data terminal is equipped with an interchangeable feature pod providing a selected data collection or communication device.

As shown in FIGS. 4, 5, and 6, the upper and lower housing shells 112 & 114 of the data terminal 110 include a large portion having evenly spaced, transversely arranged grooves 216. These grooves 216 may be looked upon as being ornamental, but the grooves also may enhance the roughness of the respective housing shell 112 & 114, thereby providing a better grip adhesion to decrease the risk that the data terminal may 110 slip from the grasp of the user and be accidentally dropped. Alternatively, the grooves could be replaced by ridges. However, the grooves are preferred because they are more readily molded than are ridges. The regions of both the lower and upper ends 116 & 118 may include smoothly textured surfaces which may be comparatively more resilient, impact or shock absorbing rubber moldings 218 & 220. These rubber moldings 218 & 220 may be co-molded to the upper and lower shells 112 & 114.

FIGS. 5 and 6 depict the lower housing shell 114 viewed from above such that the data terminal 110 may be considered to be facing down. A cavity 222 for removably receiving a power supply 140 (e.g., a rechargeable battery or battery pack) is shown disposed in the lower housing shell 114 near the lower end 116 of the data terminal 110. The power supply 140 may be removably secured within the cavity 222 by latch 224. The power supply 140 provides the data terminal 110 with power during portable operation (i.e., operation independent of a dock or external power supply). The power supply 140 preferably utilizes lithium ion electrochemical cells and has built in charge management and fuel gauge indication electronics. The power supply 140 may be charged externally to the data terminal 110 (e.g., removed from cavity 222), or while utilized therewith (i.e., inserted within cavity 222). Thus, the power supply 140 may be charged while the data terminal 110 is mounted for use in a vehicle, depot or home dock, or coupled to an external power source via the port replication apparatus (see FIG. 11). In a preferred embodiment, the power supply 140 comprises a battery pack having one or more Lithium Ion cells which may be fully charged within approximately 2.5 hours using fast charging routines.

Figure 7:
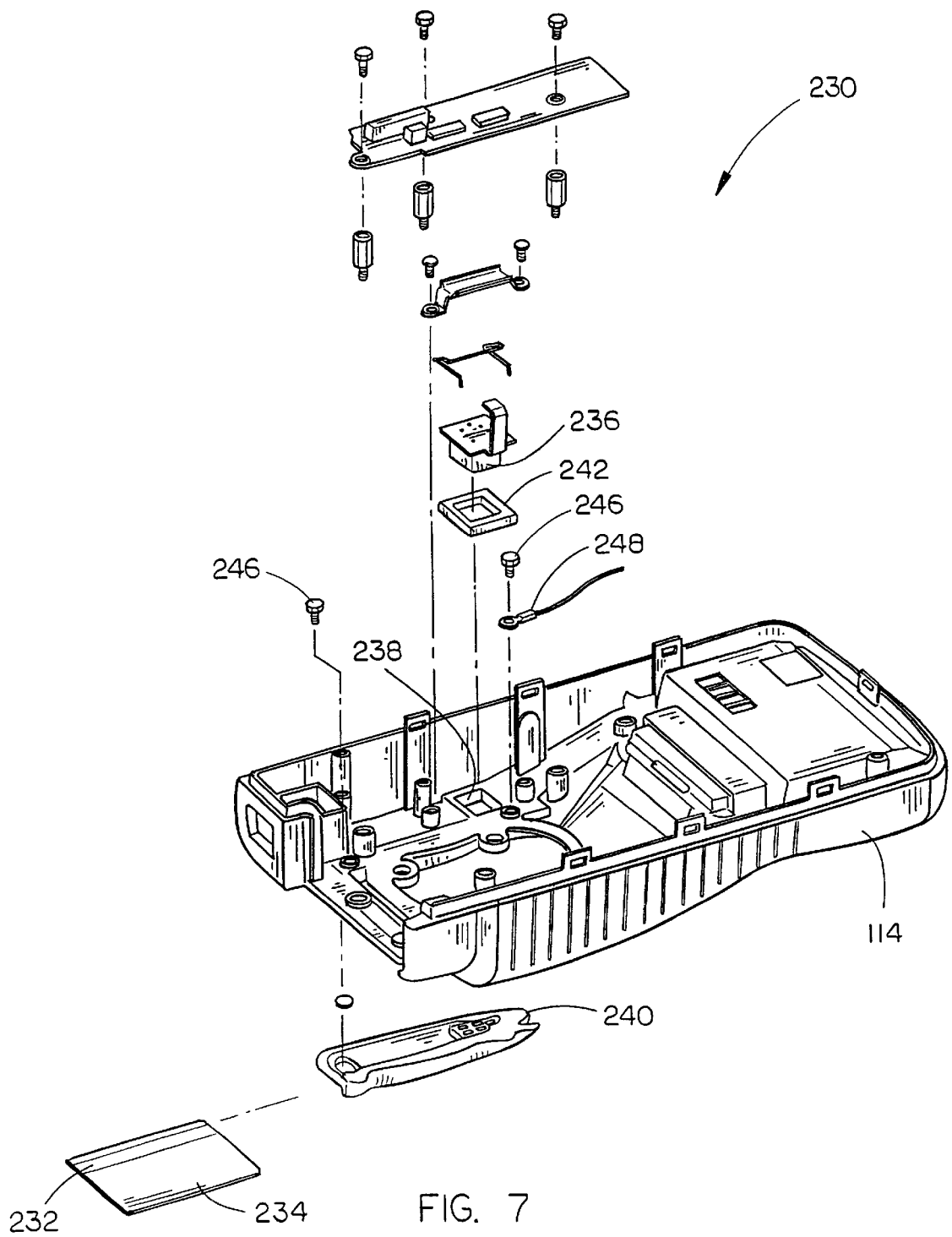
FIG. 7 is a side elevational view of the data terminal shown in FIG. 1, wherein the data terminal is equipped with an interchangeable feature pod containing a data collection or communication device (an optical indicia reader is shown) having a lever activation assembly.

Referring now to FIG. 7, a magnetic stripe reader (MSR) may be integrated into the portable data collection terminal. The integral magnetic stripe reader 230 allows reading of information stored or encoded in a magnetic stripe 232 of a magnetic stripe card 234 such as a credit card, debit card, identification card or the like. Typically, magnetic stripe cards 234 may have encoded thereon ANSI/ISO (American National Standards Institute/International Organization for Standardization) standard format magnetic stripe information. Such information may be encoded in one, two or three tracks within the magnetic stripe 232. Preferably, the magnetic stripe reader 230 reads ANSI/ISO standard format magnetic stripe information and may be configured to read one, two or all three tracks of information from the card 234. The magnetic stripe reader 230 may be utilized to read information for later verification (non-real time verification). The magnetic stripe reader 230 may also allow verification of information in real time such as verification of information (e.g., inventory, shipping, etc.) containing cards, credit and charge cards, debit cards, and the like.

The integral magnetic stripe reader 230 preferably comprises a magnetic stripe reading apparatus 236 extending through a rectangular aperture 238 in the lower housing shell 114 and a blank 240 covering the magnetic stripe reading apparatus 236. A seal or gasket 242 may be disposed between the reading apparatus 236 and the shell 114 to prevent environmental contaminants from entering the data terminal 110 (FIG. 1). Preferably, the blank 240 is shaped so that a slot 244 (see FIGS. 2 and 3) is formed between the blank 240 and the housing shell 114 when the blank 240 is attached thereto via fasteners 246. This slot 244 slidably receives a magnetic stripe card, such as card 234, wherein the magnetic stripe 232 is passed over the reading head of magnetic stripe reading apparatus 236. In this manner, the magnetic stripe reader 230 may read information encoded on the magnetic stripe 232 of the magnetic stripe card 234. Further, because the magnetic stripe reader 230 is positioned in the lower housing shell, the user is able to access and utilize the display, touch screen and keypad (see FIG. 1) while a magnetic stripe card 234 is being read.

According to an exemplary embodiment, the magnetic stripe reader 230, when not in use, is maintained in a sleep or standby mode (i.e., not activated) to conserve power. While in this sleep mode, the magnetic stripe reading apparatus 236 may be conductively coupled to the blank 240 which is in turn coupled to ground via a grounding wire 248. Preferably, when a magnetic stripe card 234 is passed through the slot 244, the conductive coupling between the magnetic stripe reading apparatus 236 and the blank 240 is momentarily interrupted or broken whereupon the magnetic stripe reading apparatus 232 is activated to read information from the card 234. According to this embodiment, the magnetic stripe reader 230 may require two passes of a magnetic stripe card 234 in order to read the information encoded thereon. During the first pass of magnetic stripe card 234 through the slot 244, the card 234 breaks the conductive connection between the magnetic stripe reading apparatus 236 and the blank 240 thereby waking up or activating the magnetic stripe reader 230. During the second pass, the magnetic stripe reader 230 reads information encoded in the magnetic stripe 232 of the magnetic stripe card 234. Preferably, if two or more magnetic stripe cards are to be read in sequence, the first pass of the first card through the slot 244 wakes up the magnetic stripe reader 230. The magnetic stripe reader 230 preferably remains active thereafter so that additional cards may each be read with a single pass. After a predetermined amount of time wherein no magnetic stripe card is read, the magnetic stripe reader 230 may again enter the sleep mode.

The magnetic card reader 230 may allow bi-directional reading of the magnetic stripe card 234 such that a card may be swiped through the slot 242 in either direction. Alternatively, the magnetic stripe reader 230 may allow only unidirectional reading of magnetic stripe cards. Additionally, the magnetic stripe reader 230 may read information into the data terminal's keyboard buffer ("wedge" input) and may be compatible with standard operating systems such as DOS, Windows™, Windows 95, Windows NT™, Sun Microsystems Java™, for example.

Returning now to FIGS. 5 and 6, the underside of the portable data collection terminal of the present invention is depicted, showing alternatively, a standard back cover, in FIG. 5, and an external interchangeable feature pod, in FIG. 6.

As shown in FIG. 5, the standard back cover 260 may cover the pod attachment cavity 262 when no external feature pod is utilized. Preferably, the back cover 260 is secured to the lower housing shell 114 by internal fasteners. In this manner, fastener holes may be eliminated from the door 260 thereby reducing the paths by which environmental contaminants may enter the data terminal 110. The power supply 140 when inserted into the data terminal 110 and secured by latch 224 preferably conforms to the surface contours of the data terminal 110 such that it becomes contiguously integrated with the lower housing shell 114. The standard back cover 260 also conforms to the surface contours of the data terminal 110 when fastened thereto and also becomes contiguously integrated with the lower housing shell 114.

Turning now to FIG. 6, an external interchangeable feature pod having a user selected data collection and processing feature may be attached to the data terminal to be utilized for a particular data collection and processing application. The interchangeable feature pod 264 may replace the standard back cover 260 (FIG. 5) to cover the pod attachment cavity 262 and thereby form part of the lower housing shell 114 of the data terminal 110. Exemplary interchangeable feature pods 264 are illustrated in FIGS. 8A through 10 wherein each interchangeable feature pod 264 may include a selected data collection or communication feature or device such as, for example, a data communication port, optical indicia reader or laser scanner, etc. to facilitate data entry and communication.

Figure 8A:
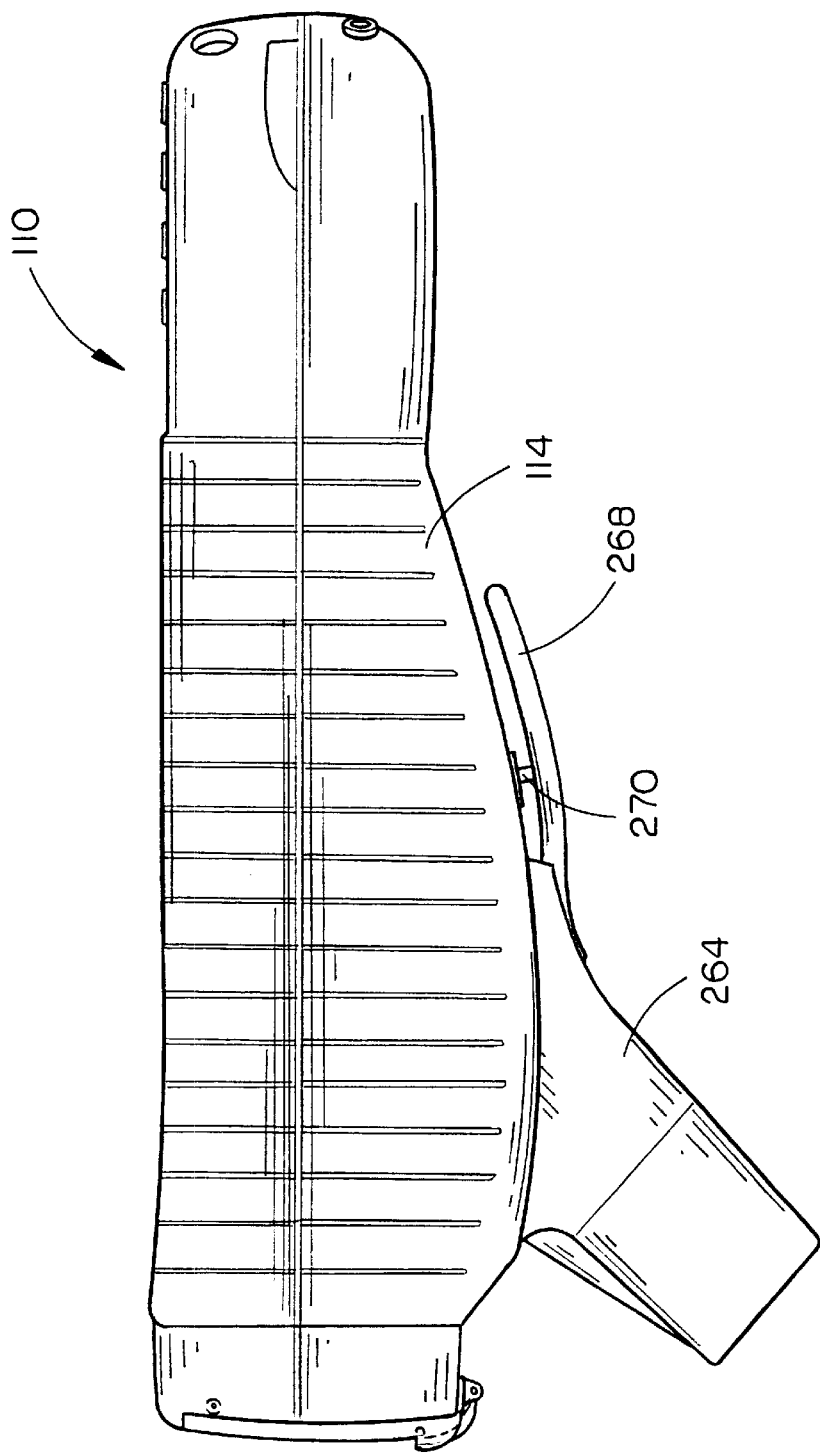
FIG. 8 is a side elevational view of the data terminal shown in FIG. 7, wherein the data collection or communication device is activated via the lever activation assembly.
Figure 8B:
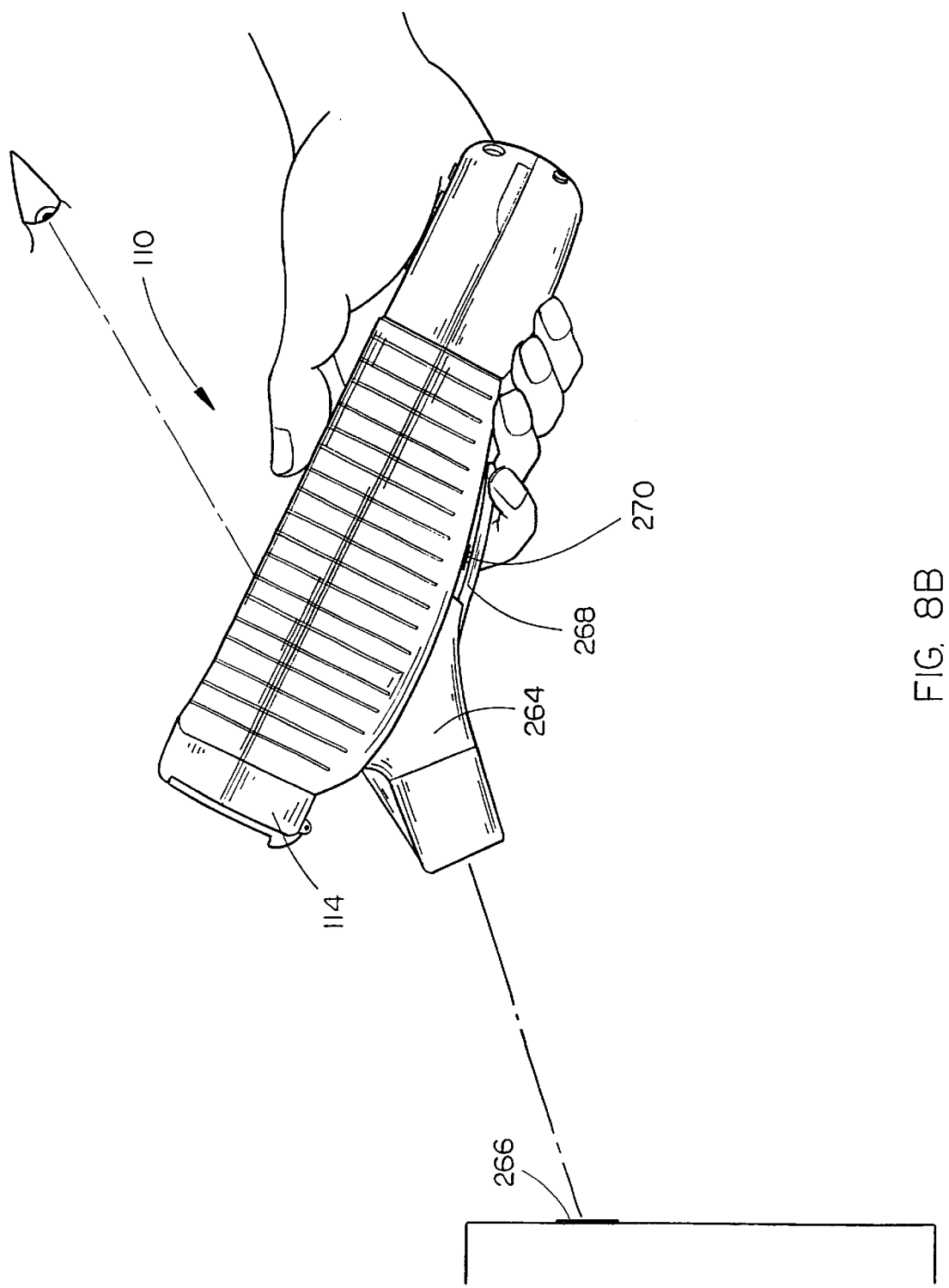
Figure 9A:
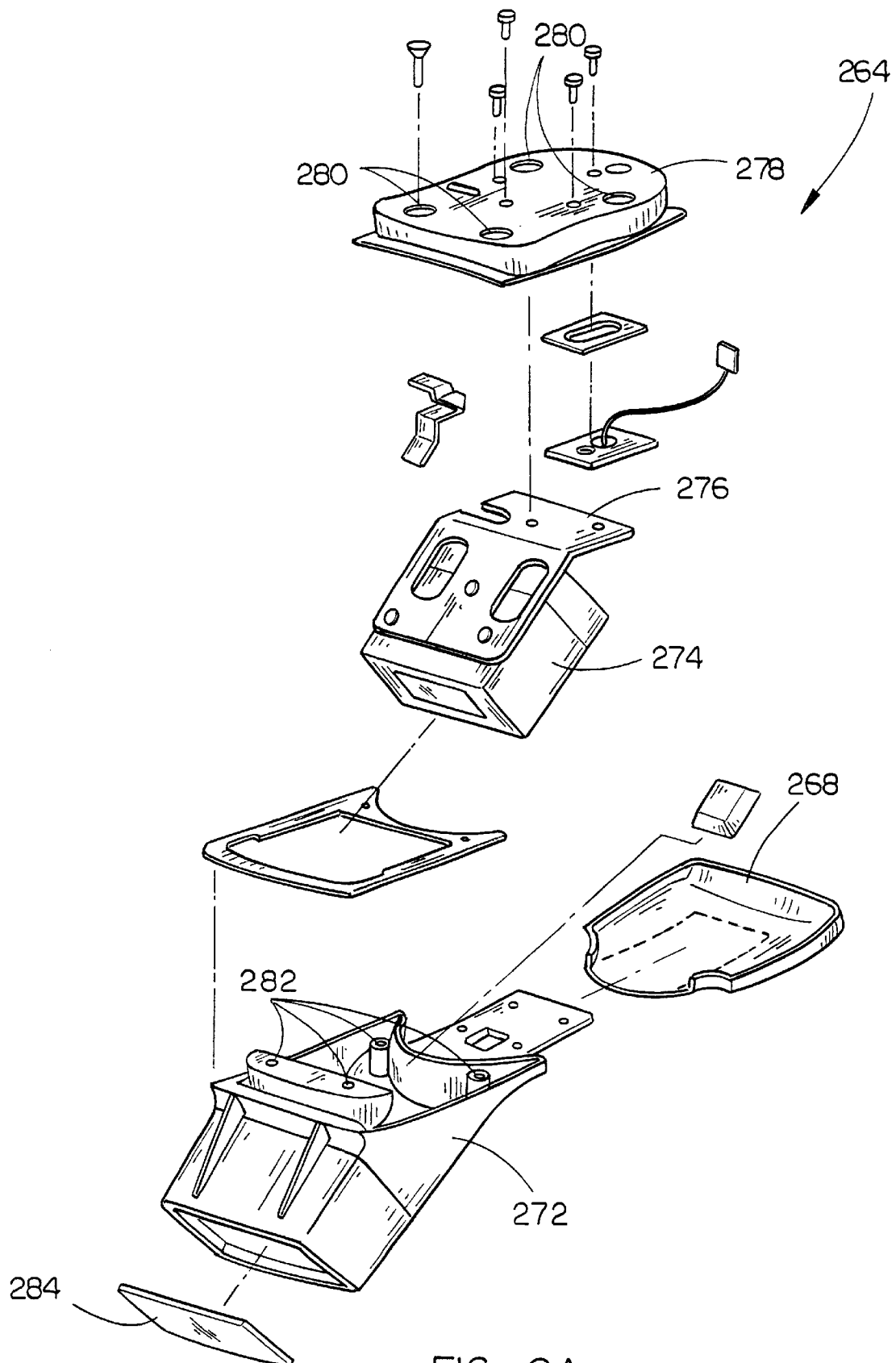
FIG. 9 is an exploded isometric view of an exemplary data collection or communication device wherein the device is an optical indicia reader.
FIG. 9B is a side elevational view of the data collection or communication device shown in FIG. 9A.

As shown in FIGS. 8A and 8B, the data collection or communication device housed within the interchangeable feature pod 264 may be an optical indicia reader such as, for example, a laser scanner, optical indicia imager, or the like. The optical indica reader 274 (FIG. 9A) may read optical indicia over multiple ranges and may read two-dimensional optical data files. Preferably, the interchangeable feature pod 264 may be mounted to the bottom housing shell 114 of the data terminal 110 such that the pod extends downward from the bottom housing shell 114 at an angle and the front of the pod 264 faces the upper end 118 of the data terminal 110. As shown in FIG. 8B, the angle and position of the feature pod 264 may provide an ergonomically efficient holding position for the user while using the optical indicia reader to collect data encoded as optically readable data files 266. For example, in a preferred exemplary embodiment, shown in FIGS. 8A and 8B, the feature pod 264 may extend downward at an acute angle, for example, approximately 40 degrees, from the bottom surface of the lower housing shell 114. In this manner, the user is not required to make any uncomfortable hand or arm manipulation to correctly aim and actuate the optical indicia reader 274 (FIG. 9A). Further, as shown in FIG. 8B, the user may view and utilize the display 120 and keypad 124 (FIG. 1) of the data terminal 110, which are preferably facing upward toward him, while utilizing the optical indicia reader.

The interchangeable feature pod 264 may also provide a compact, ergonomically efficient actuation means for activating the selected data collection or communication feature or device. As shown in FIGS. 8A and 8B, a generally flat lever 268 may extend from the base of the interchangeable feature pod 264 along the bottom surface of the lower housing shell 114. A switch 270 such as a micro-switch, for example, may be positioned beneath the lever 268 and operably coupled to the selected feature or device contained within the interchangeable feature pod 264. Preferably, when the switch 270 is open (i.e., not depressed), the selected feature or device is not activated. When the switch 270 is closed (i.e. depressed by lever 268), the selected feature or device is actuated. Thus, a user may actuate the selected feature or device by depressing the lever 268 toward the bottom surface of the lower housing shell 114, thereby depressing and closing the switch 270. For example, as shown in FIG. 8B, a user, by depressing the lever 268, may initiate data collection by the optical indicia reader.

Figure 9B:
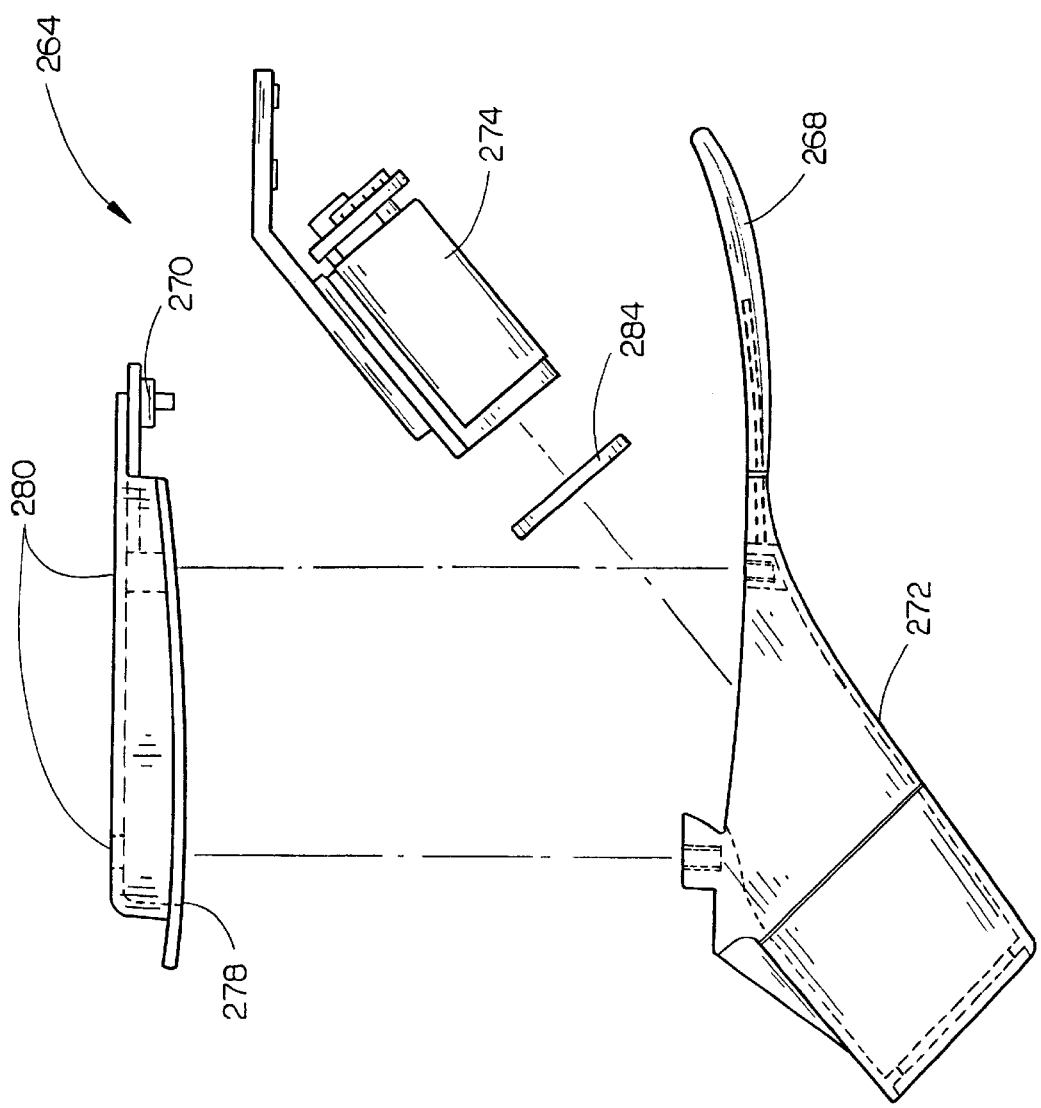

Turning now to FIGS. 9A and 9B, an interchangeable feature pod is shown wherein the selected interchangeable feature or device is an optical indicia reader such as a laser scanner, optical indicia imager, or the like. The interchangeable feature pod 264 preferably comprises a main feature pod housing 272 having a generally rectangular channel for receiving and holding the optical indicia reader 274. The optical indicia reader 274 may be secured to a mounting bracket 276 which is mounted to an attachment blank 278 for attachment within the pod attachment aperture 262 of the lower housing shell 114 (see FIG. 2). The feature pod housing 272 may be attached to the lower housing shell by means of fasteners which extend downward from the lower housing shell, through openings 280 in the blank 278, and into apertures 282 formed (e.g., molded) in the upper surface of the feature pod housing 272. The apertures 282 may include threaded inserts to secure the fasteners. A window 284, preferably of glass or plastic, may cover the end of the feature pod housing 272 to protect the optical indicia reader 274 from damage. The lever activation means preferably comprises a lever 268 positioned apart from and extending substantially parallel to the bottom surface of the bottom housing shell 114 (see FIG. 8A) and a switch 270 operably coupled to the optical indicia reader 274 wherein the switch 270 may initiate data collection by the optical indicia reader 274 when it is depressed. The switch 270 may be mounted to the blank 278 so that it is positioned between the blank 278 and the lever 268. Preferably, the lever 268 is mounted to the pod housing 272 so that it may be depressed toward the bottom surface of the lower housing shell 114 by a user as shown in FIG. 8B. Depressing the lever 268 depresses the switch 270 thereby closing the switch 270 and initiating data collection (i.e., reading of the optical indicia 266 (FIG. 8B)) by the optical indicia reader 274. When the lever 268 is released the switch 270 preferably returns to its non-depressed position whereupon data collection is terminated.

Figure 10:
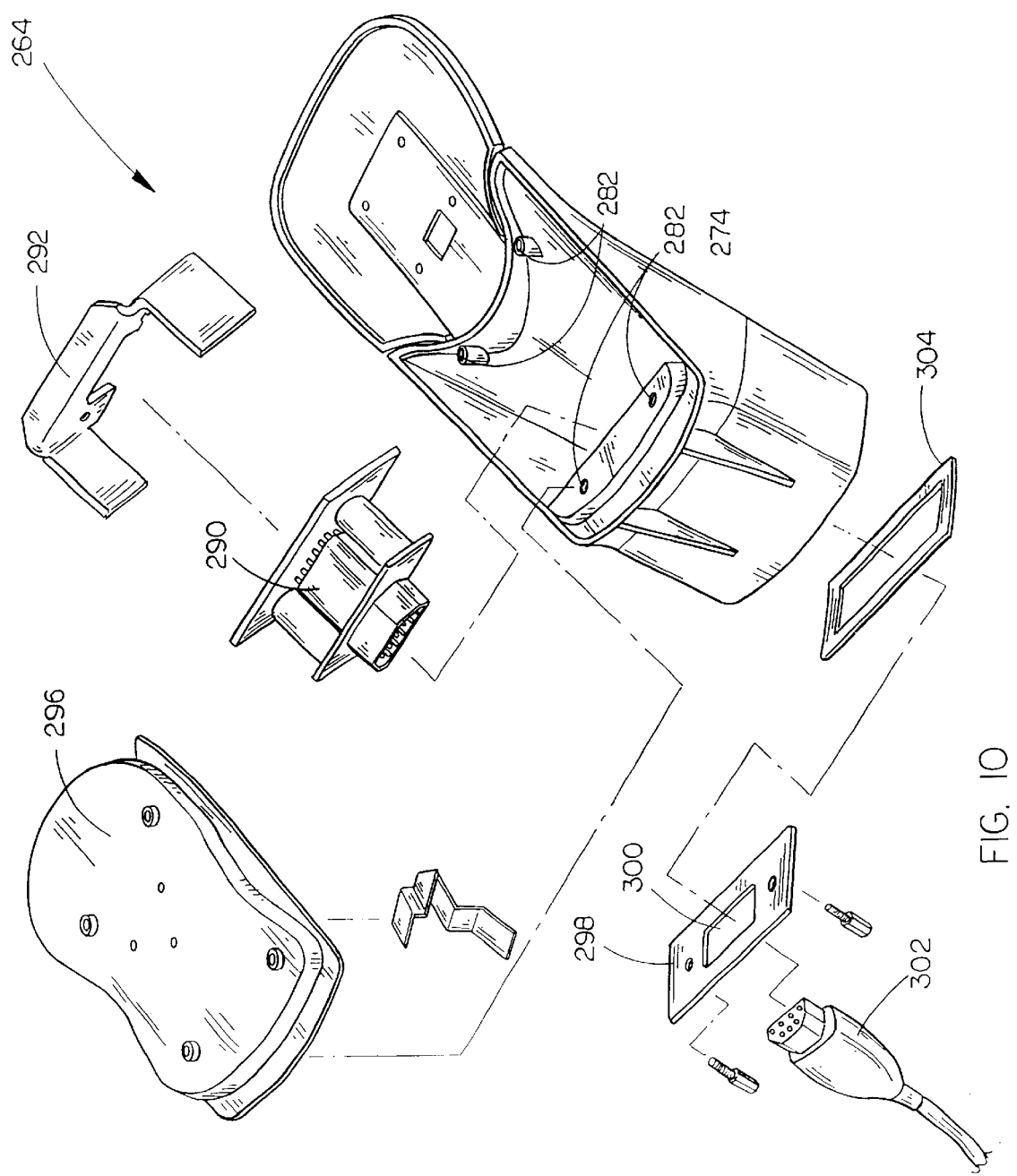
FIG 10. is an exploded isometric view of an exemplary data collection or communication device wherein the device is a connector.

Referring now to FIG. 10, the interchangeable feature pod may alternatively house a coupling device or connector (a 9-pin d-sub connector is shown). The connector may provide connection of the data terminal and an external device for communication of data. For example, the 9-pin d-sub connector shown in FIG. 10 provides serial data communication in accordance with recommended standard RS-232 for serial communication connections.

As shown in FIG. 10, a first (female) connector 290 may be mounted within the feature pod housing 274 and operably and communicatively coupled to the main circuit board of the portable data terminal (see FIG. 2) so that it is interconnected with the system bus. The first connector 290 may be mounted within the feature pod housing 274 via a mounting bracket 292. The mounting bracket 292 may in turn be mounted to an attachment blank 296 for attachment within the pod attachment aperture of the lower housing shell (see FIG. 2). The pod housing 274 is preferably attached to the data terminal housing by means of fasteners which extend downward from the lower housing shell through the blank 296 into apertures 282 molded into the pod housing 274. The apertures 282 may include threaded inserts to receive the fasteners. A plate 298 may be placed at the end of the pod housing to secure the connector 290 therein. The plate 298 may include a connector aperture 300 through which the connector 290 may extend to be coupled with a second (male) connector 302. A gasket 304 may be placed around the plate 298 to prevent the entrance of environmental contaminants into the pod housing 274.

Figure 11A:
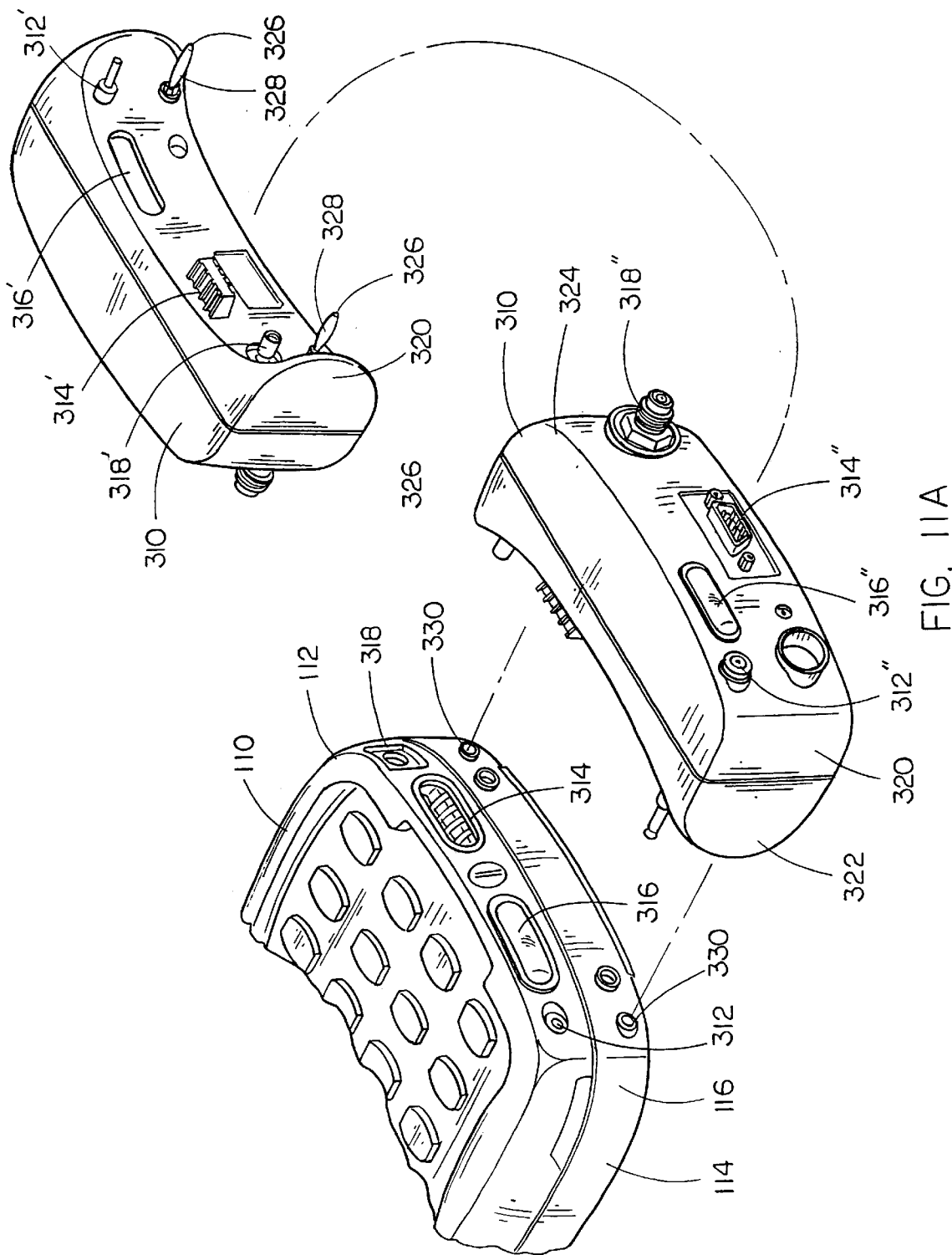
FIG. 11A is an isometric view of a port replicator configured for use with the portable data collection system of the present invention.
Figure 11B:
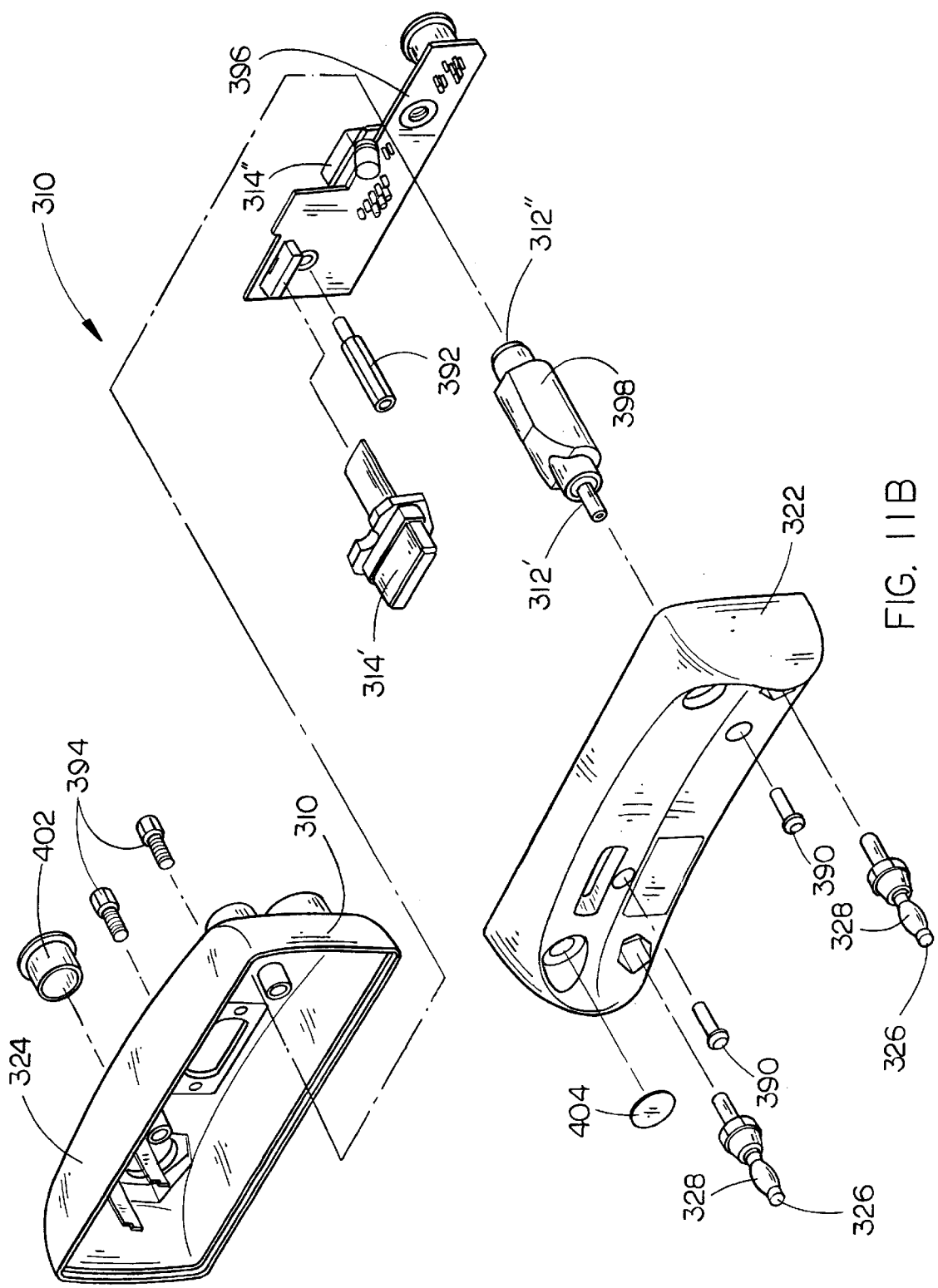
FIG. 11B is an exploded isometric view of the port replicator shown in FIG. 11A.
Figure 11C:
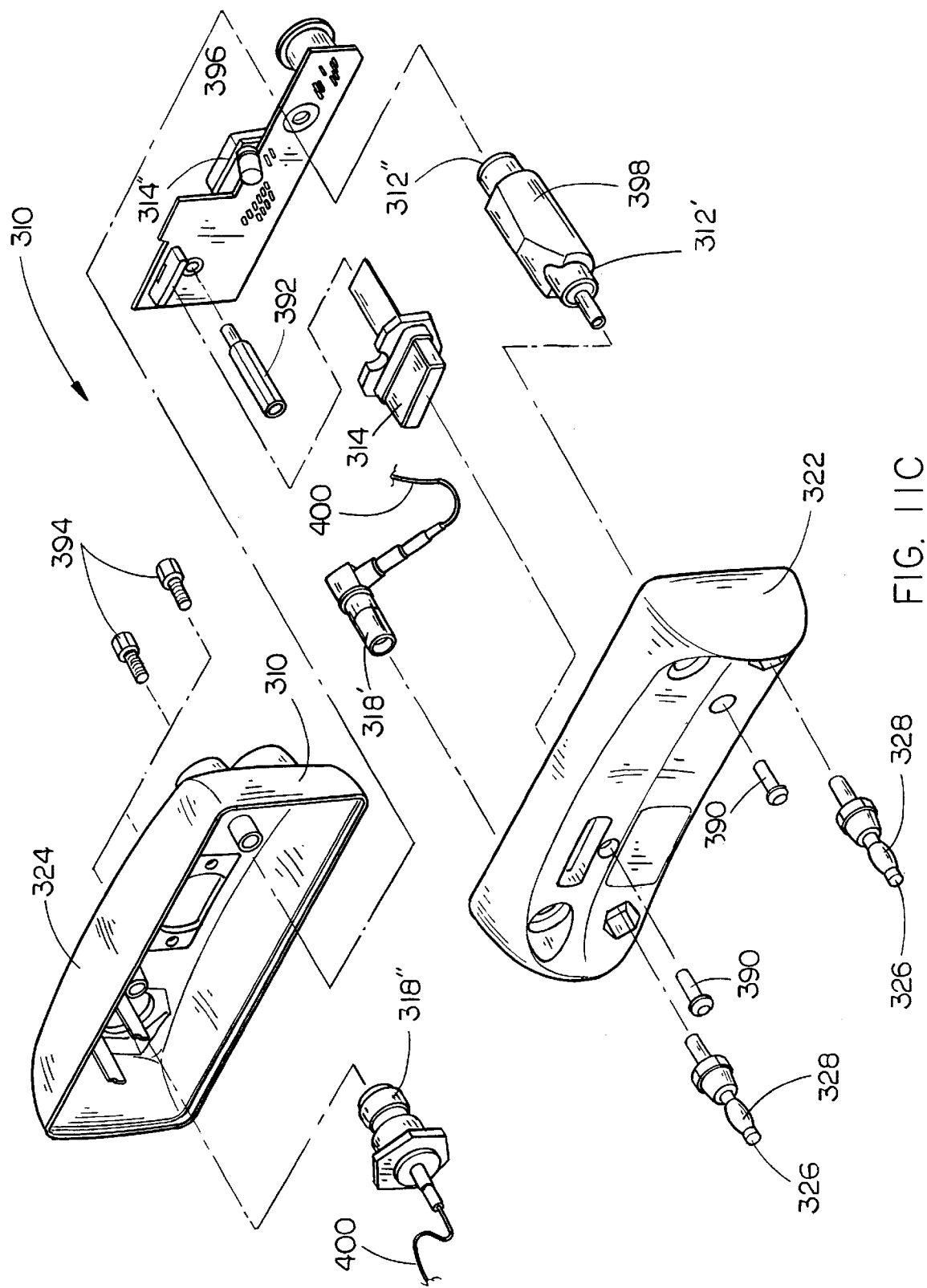
FIG. 11C is an exploded isometric view of the port replicator shown in FIG. 11A further equipped with radio frequency (RF) port connectors.

Referring now to FIGS. 11A, 11B, and 11C, an exemplary port replicator assembly or port replicator is shown. The port replicator 310 allows a user to interconnect the portable data terminal 110 with multiple peripheral devices via a single interconnection operation (i.e., attaching only the port replicator 310 to the portable data terminal 110) instead of connecting each device separately (i.e., independently connecting a line and connector from each device).

As shown in FIG. 11A, the portable data terminal 110 may have one or more communications ports 312, 314, 316, & 318 disposed at the bottom end 116 of its upper housing shell 112. For example, as shown, an ac adaptor port 312 may provide for the transfer of electrical power to the data terminal 110 from an ac adaptor (not shown). Electrical power supplied via the ac adaptor port 312 may be used for charging the internally contained power supply or battery pack 140 (see FIG. 2), operating the data terminal 110 while it is attached to the port replication apparatus 310, or alternatively, docked in a docking apparatus such as vehicle docking apparatus 126 see FIGS. 1 and 12 through 16). Similarly, a docking port 314 may provide for data communication such that collected data may be batched to a central or host computer or host data terminal (not shown), and new program software may be downloaded to the data terminal 110 (and stored in the nonvolatile semipermanent memory (e.g., FLASH memory), for example). An infrared data communications port 316 may also be provided for two-way infrared data communications. The infrared data communications port 316 preferably provides for infrared data communications conforming to IrDA (Infrared Developers Association) standards. An external RF port 318 may be provided for connection of an RF cable assembly (e.g., RF cable assembly 400 shown in FIG. 11C, a coaxial cable assembly, etc.). The RF port 318 may, in an exemplary embodiment, allow RF transceiver, for example, a PCMCIA card based transceiver, within the portable data terminal 110 to be coupled to an external antenna. This antenna may be mounted to or within the docking station or, alternatively, may be remotely located, for example, on the roof of a building such as a warehouse, delivery truck dock, or the like. In this manner, the data terminal's RF transceiver may be coupled to an antenna which provides improved characteristics such as greater gain, improved efficiency, or higher sensitivity.

As shown in FIGS. 11A, 11B, and 11C, the port replicator 310 preferably comprises a housing 320 having an inner half 322 and an outer half 324 joined together via fasteners (e.g., screws 390, standoffs 392, and screw retainers 394 are shown in FIGS. 11B and 11C). The outer surface of inner half 322 may be contoured to fit against the bottom end 116 of the portable data terminal 110, and includes internal connectors 312', 314', 316', & 318' configured to mate with connectors of ports 312, 314, 316 & 318, respectively. The internal connectors 312', 314', 316', & 318' are interconnected through the port replicator 310 with external connectors 312", 314", 316", & 318" disposed on the outer half 320. The external connectors 312", 314", & 318" allow attachment of lines or cables for coupling the portable data terminal 110 to external devices, a network, external power, and the like (not shown). Preferably, the lines or cables remain attached to the port replicator 310. The port replicator 310 may then be coupled to (or removed from) the data terminal 110 thereby connecting all (or disconnecting all) of the lines in a single connection (or disconnection) operation. Further, as shown in FIG. 11A, the inner half 320 may, in an exemplary embodiment, comprise a window assembly 316' configured to pass infrared light emitted by the infrared port 316 through the housing 318 to an external infrared lens assembly 316" disposed on the outer half 324.

The external connectors 312", 314", & 318" may be identical to the corresponding connectors of ports 312, 314, & 318 of the portable data collection terminal 110 with which they are interconnected. This allows the ports 312", 314"& 318" to be replicated by an identical connector on the outer shell 324 of port replicator 310 for attachment of a line or cable. Alternatively, any or all of the external connectors 312", 314", & 318" may be replicated by a different type or style of connector than the corresponding connector of ports 312, 314, & 318. For example, the connector of the docking port 314 may be replicated by a 9-pin d-sub connector 314" thereby providing a more standard RS-232 compatible serial connection to an external device, network or the like. Preferably, the internal docking port connector 314' which mates with the docking port connector 314 and 9-pin d-sub connector 314" are interconnected by circuit card assembly 396. Similarly, the plug-type RF port 318 shown in FIGS. 11A and 11C, may be replicated by a threaded coaxial connector 318" for a standard connection to a coaxial cable (not shown). An RF cable assembly 400 interconnects internal RF connector 318' with the threaded coaxial cable connector 318. As shown in FIG. 11B, wherein the portable data terminal 110 does not support RF communication via RF port 318, or, alternatively, wherein RF communication is supported but connection of RF port 318 via the port replicator is not desired, the RF connectors 318' and 318" and RF cable assembly 400 of the port replicator 310 are not required and may be eliminated or removed. Holes in the inner and outer halves 322 & 324 may be covered by plugs or covers 404 & 406 to prevent the intrusion of environmental contaminants into the port replicator's housing 320.

The port replicator 310 may be removably attached to the lower housing shell 114 of the data terminal 110 via two locating fasteners or plugs such as banana plugs 326, for example. The banana plugs 326 preferably comprise a post 328 having flexible sides made of spring metal which engage apertures 330 in the housing shell 114. Friction between the flexible sides of the post 328 and the internal walls of the aperture 330 hold the banana plug 326 in place thereby securing the port replication apparatus 310 to the data terminal 110.

Turning now to FIGS. 12 through 16, a docking apparatus for use with the portable data collection system of the present invention is shown. Preferably, the docking apparatus 126 securely retains the portable data terminal 110 so that it may be mounted to a surface within the interior cabin of a vehicle such as a delivery van or the like. However, it should be appreciated that the docking apparatus 126 may also be mounted to a support at a fixed location such as a warehouse, point of sale, or the like.

Figure 12:
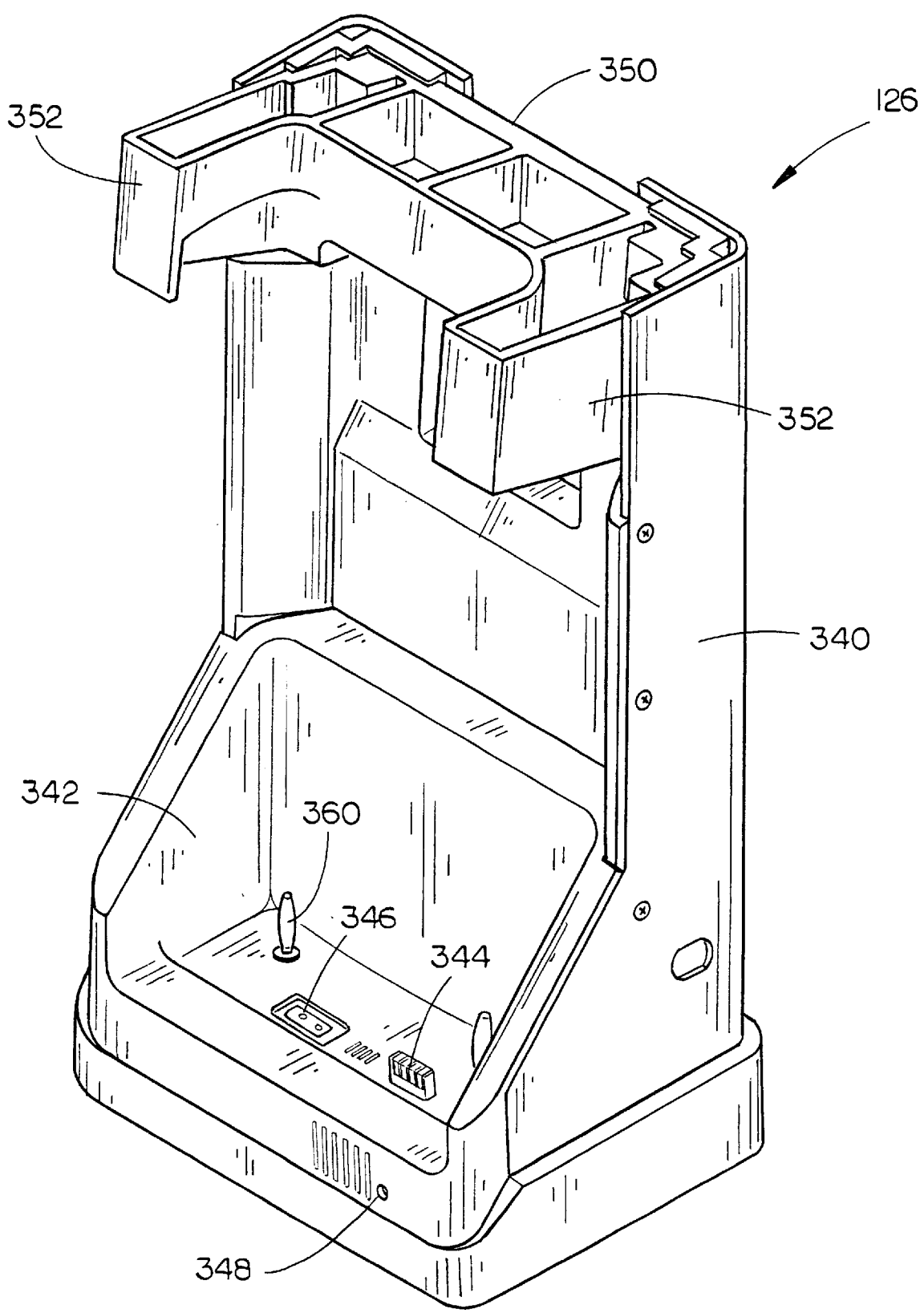
FIG. 12 is an isometric view of the vehicle docking apparatus illustrated in FIG. 1.

As shown in FIG. 12, the docking apparatus 126 includes a housing 340. A terminal cup 342 into which the portable data collection terminal 110 (FIG. 1) may be removably inserted is formed in the housing 340. Preferably, the interior shape of the terminal cup 342 conforms to the exterior shape of the bottom end of the data terminal 110 (FIG. 1). This allows the data terminal 110 (FIG. 1) to be held securely within terminal cup 342 so that a steady connection is made between the ports of the data terminal and the respective connectors 344 & 346 disposed within the terminal cup 342. The terminal cup 342 may have a frontal opening to allow access by the user to the keypad 122 and display 120 of a data terminal 110 (FIG. 1) while it is docked therein. An indicator light 348 (e.g., a light emitting diode (LED)) may be located on a front surface of the housing 340 to indicate when the data terminal 110 (FIG. 1) is properly seated within the terminal cup 342 and current is flowing between vehicle dock 126 and the data terminal 110 (FIG. 1). The indicator light 340 may be used, for example, to indicate when the data terminal's power supply 140 (FIG. 2) is being charged, when the data terminal is being operated by the electrical system of the vehicle, when data transfer is taking place, etc. A retaining arm assembly 350 may be slidably mounted to the housing 340 such that it may move between a first or lowered position wherein the portable data terminal is retained in the docking apparatus 126 and a second or raised position wherein the portable data terminal may be removed from the docking apparatus 126 (see FIGS. 14 and 15). Preferably, the retaining arm assembly 350 comprises spaced apart retaining arms 352 shaped to engage the upper end 118 of the portable data terminal 112 and to allow access to the portable data terminal's display 120 and touch screen 138 while the data terminal 110 is docked (FIGS. 1 and 2).

Figure 13:
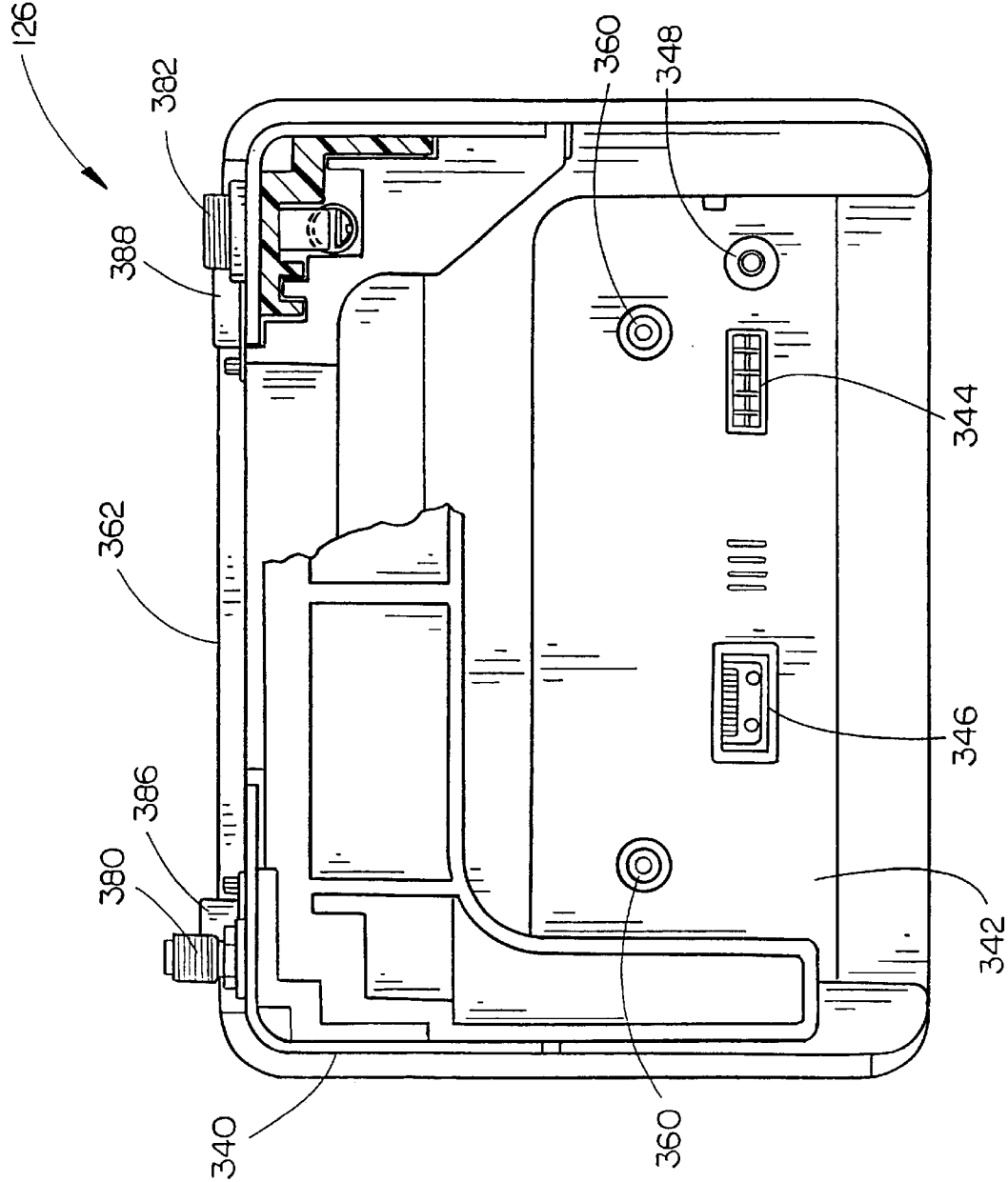
FIG. 13 is a cross sectional side elevational view of the docking apparatus shown in FIG. 1.

Turning now to FIG. 13, the terminal cup 342 may be contoured to fit against the bottom end 116 of the data terminal 110. Disposed within the terminal cup 342 are connectors 344, 346 & 348 configured to mate with the respective connectors of ports 314,316 & 318 on the lower end 116 of a data terminal 110 (see FIG. 11A). Thus, the placement of the connectors in the terminal cup 342 is dictated by the placement of connectors and ports on the data terminal 110. The connectors 344, 346, & 348 may be coupled to connectors 380, 382, 384, 386, & 388 on a back surface 362 of the docking apparatus housing 340 for connection of various external devices (see FIG. 16). The connectors 380, 382, 384, 386, & 388 may comprise different types of connectors than the ports 344, 346, & 348 with which they are coupled. For example, docking port connector 344 may be coupled to one or more 9-pin d-sub connectors 386 & 388 thereby providing an RS-232 compatible serial connection to an external device, network or the like. Similarly, coaxial antenna port 348 may be coupled to threaded coaxial connector 380 for a standard connection to a coaxial cable. Additionally, the terminal cup 342 comprises an infrared port 346 configured to mate with an infrared port disposed on the data terminal (see FIG. 11A). The infrared port 346 may be coupled to one or more 9-pin d-sub connectors 386 & 388 thereby providing an RS-232 compatible serial connection to an external device, network, or the like.

Figure 14:
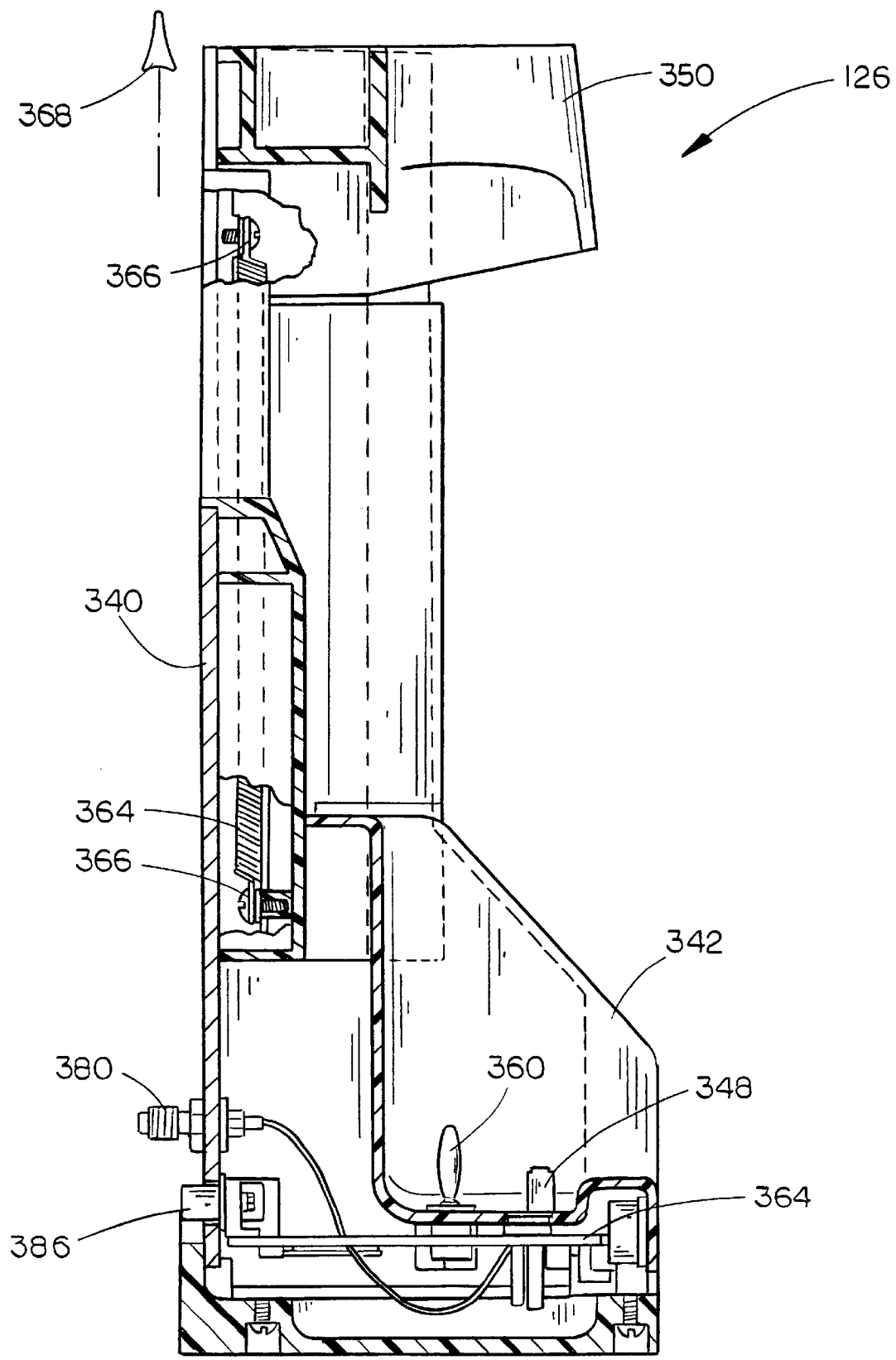
FIG. 14 is a partial cross sectional side elevational view of the docking apparatus shown in FIG. 12, further illustrating the insertion of a portable data terminal therein.

As shown in FIGS. 12, 13, and 14, the terminal cup 342 may have extending upwardly from a bottom surface thereof, two fastening devices such as banana plugs 360 or the like. Like the banana plugs 326 utilized by the port replication apparatus 310 shown in FIGS. 11A, 11B, and 11C, the banana plugs 360 utilized by the docking apparatus 126 preferably comprise a post 328 having flexible sides made of spring metal which engage apertures 330 in the housing shell 114 (see FIG. 11). Friction between the flexible sides of the post 328 and the internal walls of the aperture 330 hold the banana plug 360 in place thereby preventing movement between the data terminal and the connectors 344, 346, & 348 due to vibration, for example. The plugs 360 may have a threaded base so that they may be removable from the terminal cup 342, wherein the docking apparatus 126 may be utilized with other data terminals not so equipped.

Figure 16:
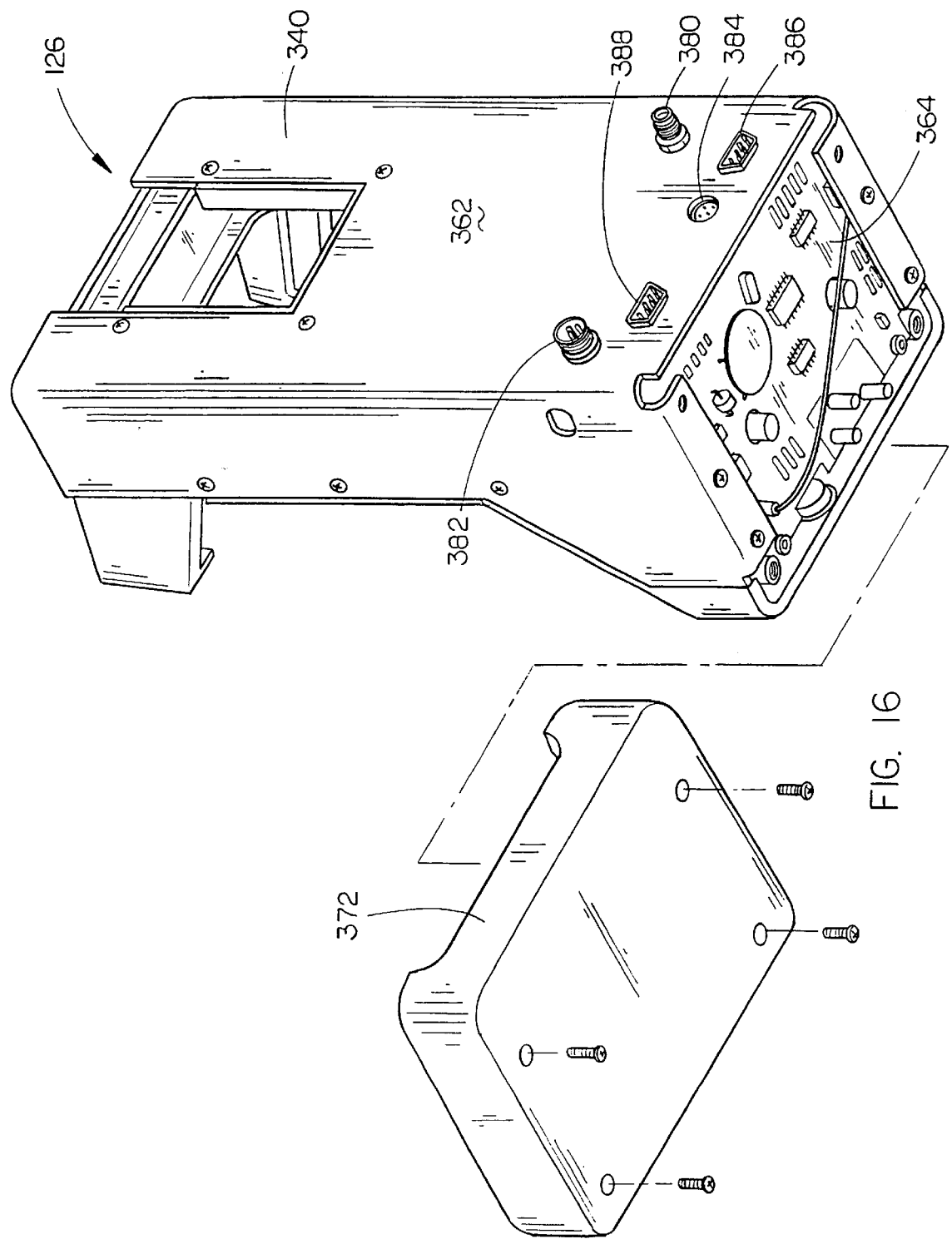
FIG. 16 is a partially exploded isometric view of the docking apparatus shown in FIG. 12.

Referring now to FIG. 14, connectors 344, 346, & 348 may be coupled to a circuit board 364, and may provide electrical coupling to the vehicle's power supply or other external power supply via dc adaptor connector 352, and for data communication via data communication connectors 380, 384, 386, & 388 (see FIGS. 13 & 16).

Figure 15:
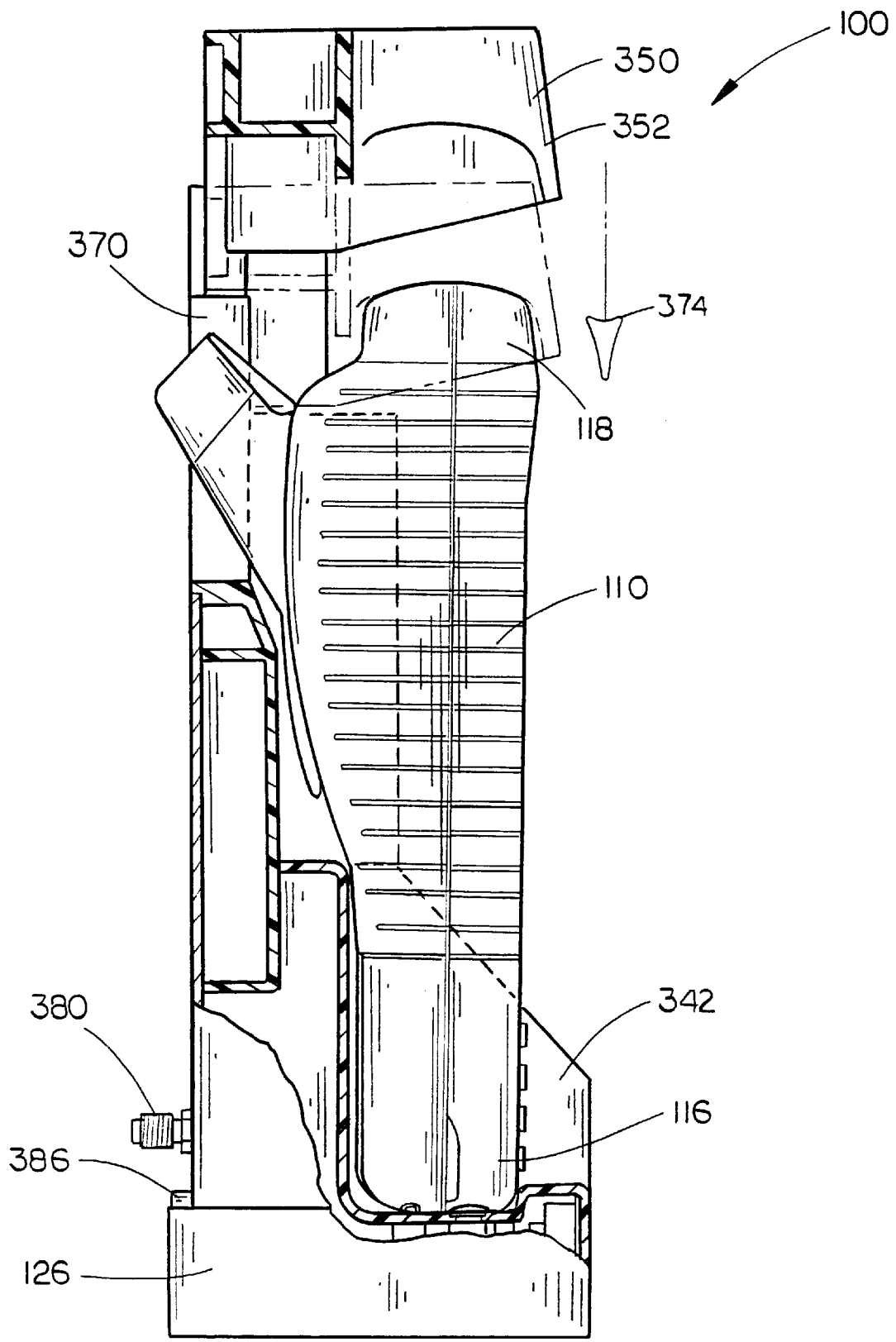
FIG. 15 is a partial cross sectional top plan view of the docking apparatus depicting an exemplary connector arrangement.

As shown in FIGS. 1, 14 and 15, the retaining arm assembly 350 is preferably moved between a lowered position wherein the portable data terminal 110 is retained in the docking apparatus 126 (see FIG. 1) and a raised position wherein the portable data terminal 110 may be removed from the docking apparatus 126 by the user (see FIG. 15). A tensioning mechanism such as spring 364 may be attached between the housing 340 and a the retaining arm assembly 350 via fasteners 366 such as screws or the like. Preferably, the spring 364 provides sufficient tension force to move the retaining arm assembly 350 from the raised position to the lowered position and to engage the retaining arm assembly with the data terminal.

Turning now to FIG. 15, a data terminal is shown placed in the vehicle docking apparatus of the portable data collection system. Retaining arm assembly 350 is depicted in a raised position by solid lines, and in lowered position by phantom lines. To dock a portable data terminal 110 of the data collection system 100 in the vehicle docking apparatus 126, the retaining arm assembly 350 is first moved from its lowered position to its raised position. This step may be accomplished by first inserting the upper end 118 of the data terminal 110 into the retaining arms 352 (see FIG. 12) of the retaining arm assembly 350 and lifting the data terminal 110, thereby applying a force on the retaining arm assembly 350 causing it to be moved in the direction of arrow 368 in FIG. 14. Once the retaining arm assembly 350 is moved to its raised position, the bottom end 116 of the data terminal 110 may be rotated into the terminal cup 116 whereupon banana plugs 360 may engage the bottom end 116 of the data terminal 110. The retaining arm assembly 350 may then be moved from its raised position to its lowered position via the spring 364 in the direction of arrow 374 in FIG. 15. To remove the data terminal 110 from vehicle dock 126, the procedure is reversed. The retaining arm assembly 350 is moved from its lowered position to its raised position, wherein the data terminal may be grasped by the user and removed from the terminal cup 342 and, thus, from the vehicle dock 126. An opening 370 may be provided in the back face of the docking apparatus housing 340 through which an interchangeable feature pod 264 may extend when attached to the data terminal 110.

Turning now to FIG. 16, the back of the vehicle docking apparatus is shown. A bottom cover plate 372 is shown removed from the vehicle docking apparatus housing 340 such that circuit board 364 may be more clearly seen. The vehicle docking apparatus 126 may be electrically coupled to the vehicle's power supply or other external power supply via dc adaptor connector 352, and operably coupled to an external device for data communication via data communication connectors 380, 384, 386, & 388.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A portable data collection system, comprising:
a portable data terminal including a housing having an aperture disposed therein;
a magnetic stripe reading apparatus disposed in said housing and extending through said aperture for reading information magnetically encoded on a magnetic stripe card;
a blank attached to said housing and covering said magnetic stripe reading apparatus; and
said blank and said housing forming a slot configured to receive a magnetic stripe card such that said magnetic stripe card is passed over said magnetic stripe reading apparatus to read information encoded on said magnetic stripe card.

2. The portable data collection system of claim 1, wherein said magnetic stripe reading apparatus is conductively coupled to said blank to deactivate said magnetic stripe reading apparatus.

3. The portable data collection system of claim 2, wherein said magnetic stripe reading apparatus is decoupled from said blank by said magnetic stripe card received in said slot to activate said magnetic stripe reading apparatus.

4. The portable data collection system of claim 1, wherein said magnetic stripe reading apparatus is configured to read at least one track of information encoded in a magnetic stripe disposed on said magnetic stripe card.

5. The portable data collection system of claim 1, further comprising an interchangeable feature pod for removable attachment to said housing.

6. The portable data collection system of claim 5, wherein said interchangeable feature pod extends at an angle to said housing.

7. The portable data collection system of claim 6, wherein said interchangeable feature pod comprises an optical indicia reader.

8. The portable data collection system of claim 7, wherein said interchangeable feature pod comprises a lever activation assembly operably coupled to said optical indicia reader, and wherein said lever activation assembly is configured to initiate data collection by said optical indicia reader.

9. The portable data collection system of claim 7, wherein said lever activation apparatus comprises a lever positioned apart from and extending substantially parallel to said housing and a switch disposed between said lever and said housing, said lever pivotally attached to said feature pod so that said lever may be depressed toward said housing to activate said switch.

10. The portable data collection system of claim 7, wherein said optical indicia reader is a laser scanner.

11. The portable data collection system of claim 7, wherein said optical indicia reader is an optical indica imager.

12. The portable data collection system of claim 11, wherein the optical indicia imager comprises a charged coupled device.

13. The portable data collection system of claim 7, wherein said optical indicia reader is configured to read a two-dimensional data code file.

14. The portable data collection system of claim 5, wherein said interchangeable feature pod comprises a communication coupling device.

15. The portable data collection system of claim 14, wherein said communication coupling device comprises a serial port connector.

16. The portable data collection system of claim 1, wherein said housing further comprises a bay for receiving at least one removable module.

17. The portable data collection system of claim 16, wherein said removable module comprises a PCMCIA card.

18. The portable data collection system of claim 16, further comprising a pivoting door covering said bay.

19. The portable data collection system of claim 1, further comprising a port replication assembly removably attachable to said housing and configured to operatively couple said data terminal to an external device.

20. The portable data collection system of claim 1, further comprising a docking apparatus configured to removably receive said portable data terminal therein.

21. A portable data collection system, comprising:
(a) a housing including a bottom portion and a top portion;
(b) a feature pod configured for removable attachment to said bottom portion wherein said feature pod extends at an angle from said bottom portion,
(c) a selected feature contained within said feature pod; and
(d) a lever activation assembly operably coupled to said feature pod for activating said selected feature.

22. The portable data collection system of claim 21, wherein said lever activation assembly further comprises:
a lever pivotally attached to said interchangeable feature pod, said lever positioned apart from and extending substantially parallel to said bottom portion; and
a switch disposed between said lever and said bottom portion, said switch operable to activate said feature;
a said lever configured to be depressed toward said bottom portion for operating said switch.

23. The portable data collection system of claim 22, wherein said feature comprises an optical indicia reader.

24. The portable data collection system of claim 23, wherein said optical indicia reader is a laser scanner.

25. The portable data collection system of claim 23, wherein said optical indicia reader is an optical indica imager.

26. The portable data collection system of claim 25, wherein the optical indicia imager comprises a charged coupled device.

27. The portable data collection system of claim 25, wherein said optical indicia reader is configured to read a two-dimensional data code file.

28. The portable data collection system of claim 22, wherein said feature comprises a communication coupling device.

29. The portable data collection system of claim 28, wherein said communication coupling device comprises a serial port connector.

30. The portable data collection system of claim 21 further comprising a magnetic stripe reader disposed in said bottom portion adjacent to said feature pod, said magnetic stripe reader configured to read information magnetically encoded on a card.

31. The portable data collection system of claim 30, wherein said magnetic stripe reader comprises:
a magnetic stripe reading apparatus disposed in said housing and extending through said aperture for reading information magnetically encoded on a magnetic stripe card; and
a blank attached to said housing and covering said magnetic stripe reading apparatus;
said blank and said housing forming a slot configured to receive a magnetic card such that said magnetic card is passed over said magnetic stripe reading apparatus wherein said magnetic stripe reading apparatus reads information magnetically encoded on said magnetic stripe card.

32. The portable data collection system of claim 31, wherein said magnetic stripe reading apparatus is conductively coupled to said blank to deactivate said magnetic stripe reading apparatus.

33. The portable data collection system of claim 31, wherein said magnetic stripe reading apparatus is decoupled from said blank by said magnetic stripe card received in said slot to activate said magnetic stripe reading apparatus.

34. The portable data collection system of claim 31, wherein said magnetic stripe reader is configured to read at least one track of information encoded in a magnetic stripe disposed on said magnetic stripe card.

35. The portable data collection system of claim 21, further comprising a bay configured to receive at least one removable module wherein said removable module is operatively coupled to said portable data terminal.

36. The portable data collection system of claim 35, wherein said removable module comprises a PCMCIA card.

37. The portable data collection system of claim 35, further comprising a pivoting door at least partially covering said bay.

38. The portable data collection system of claim 21, further comprising a port replication assembly, said port replication assembly removably attachable to said housing and configured to operatively couple said data terminal to an external device.

39. The portable data collection system of claim 21, further comprising a docking apparatus configured to removably receive said housing therein.

40. The portable data collection system of claim 39, wherein said docking apparatus includes an aperture configured to allow extension of said interchangeable feature pod there through when said portable data terminal is docked.

41. A portable data collection system comprising:
a portable data collection terminal having a bottom end and a top end; and a docking apparatus for docking said portable data collection terminal, said docking apparatus including:
  a housing having a terminal cup configured to removably receive said bottom end of said portable data terminal and
  a retaining arm assembly configured to engage said upper end; said retaining arm assembly slidably mounted to said housing
  said retaining arm assembly configured to be moved between a lowered position wherein said portable data terminal is retained in said docking apparatus and a raised position wherein said portable data terminal may be removed from said docking apparatus.

42. The portable data collection system of claim 41, wherein said housing includes an opening configured to allow a portion of said portable data collection terminal to extend there through when said portable data terminal is docked in said docking apparatus.

43. The portable data collection system of claim 41, wherein said docking apparatus comprises means for electrically coupling said portable data collection terminal to the electrical system of a vehicle.

44. The portable data collection system of claim 41, wherein said docking apparatus further comprises a spring mounted between said housing and said retaining arm assembly, said spring configured to urge said retaining arm assembly from said raised position to said lowered position.

* * * * *